United States Patent
Lequeux

(10) Patent No.: US 9,779,129 B1
(45) Date of Patent: Oct. 3, 2017

(54) SYSTEMS AND METHODS FOR INTEGRATING DATA

(71) Applicant: Express Scripts, Inc., St. Louis, MO (US)

(72) Inventor: Blayne S. Lequeux, Dana Point, CA (US)

(73) Assignee: Express Scripts, Inc., St. Louis, MO (US)

( * ) Notice: Subject to any disclaimer, the term of this patent is extended or adjusted under 35 U.S.C. 154(b) by 320 days.

(21) Appl. No.: 14/484,176

(22) Filed: Sep. 11, 2014

Related U.S. Application Data

(60) Provisional application No. 61/876,253, filed on Sep. 11, 2013.

(51) Int. Cl.
 *G06F 17/00* (2006.01)
 *G06F 17/30* (2006.01)

(52) U.S. Cl.
 CPC .............................. *G06F 17/30386* (2013.01)

(58) Field of Classification Search
 CPC .. G06F 1/3203; G06F 17/30303; G06F 17/40; G06F 19/3418; G06F 17/245; G06F 17/246; G06F 17/30115; G06F 17/30289; G06F 17/30371; G06F 17/30563; G06F 17/30592; G06F 17/30607; G06F 19/321
 See application file for complete search history.

(56) References Cited

U.S. PATENT DOCUMENTS

| | | |
|---|---|---|
| 6,859,780 B1 | 2/2005 | Cunningham |
| 7,630,908 B1 | 12/2009 | Amrien et al. |
| 8,099,339 B1 | 1/2012 | Pinsonneault et al. |
| 2006/0053294 A1* | 3/2006 | Akenine ............. H04L 63/0428 713/178 |
| 2007/0129969 A1* | 6/2007 | Burdick ................ G06F 19/322 705/3 |
| 2009/0076850 A1 | 3/2009 | Hansell et al. |
| 2012/0185264 A1 | 7/2012 | Demogenes et al. |
| 2013/0090947 A1 | 4/2013 | Nockley |
| 2013/0238642 A1* | 9/2013 | Clayton ................ G06F 19/363 707/756 |

* cited by examiner

*Primary Examiner* — Yicun Wu
(74) *Attorney, Agent, or Firm* — Husch Blackwell LLP

(57) ABSTRACT

Systems and methods for integrating data are described. In an example embodiment, a plurality of data attributes of comparison data and the plurality of data attributes of a master record are respectively compared to determine that there is a difference, the comparison data originating from a data source. A relative level of source priority of the data source of the comparison data is determined relative to the data source of a current state version of the master record in accordance with source evaluation criteria. The current state version of the master record is stored in reference data based on a determination that there is a difference and that the source priority of the data source of the comparison data is equal to or greater than the data source of the current state version of the master record. Mapped comparison data is used to update the current state version of the master record based on the determination that there is a difference and that the source significance of the data source of the comparison data is equal to or greater than the data source of the current state version of the master record to create an updated state version of the master record, the mapped comparison data being based on the comparison data. Additional methods and systems are disclosed.

20 Claims, 45 Drawing Sheets

SYSTEMS AND METHODS FOR INTEGRATING DATA

CROSS-REFERENCE TO A RELATED APPLICATION

This application claims the benefit of U.S. provisional patent application 61/876,253 filed on 11 Sep. 2013, entitled "Systems and Methods for Claims Data Processing," the entire disclosure of which is incorporated herein by reference.

FIELD

The field relates to data management systems, and more particularly to a system for integrating data.

BACKGROUND

A tremendous amount of transaction and interaction data is collected by a number of different entities. Often times, the data is overwhelming to intake, process, analyze, and/or provide meaningful output therefrom including insights.

BRIEF DESCRIPTION OF THE DRAWINGS

FIGS. 14-47 are example displays, according to example embodiments; and

DETAILED DESCRIPTION

Example systems and methods for integrating data are described. In the following description, for purposes of explanation, numerous specific details are set forth in order to provide a thorough understanding of example embodiments. It will be evident, however, to one of ordinary skill in the art that embodiments of the invention may be practiced without these specific details.

The methods and systems may be used to maintain records or other data on certain persons and entities. In the context of healthcare, and prescription drugs more specifically, master records may be maintained on prescribers, pharmacies, and patients. These records contain certain information about these healthcare participants including name, address, phone number, and the like.

The records may be derived from various data sources. The data sources may have information on these healthcare participants in different forms and different spellings. In addition, some of the data provided by the data sources may be erroneous. The methods and systems may determine from among the information received what is most valuable and likely correct and promote, or highlight, this information. The promoted information may be used for display, analysis, or the like.

In addition to maintaining the master records, the development of the master records enable insights into what would otherwise be disparate information and thereby enable accurate viewing and other utilizations of relevant prescription drug claims, medical claims, and the like.

In some embodiments, the methods and systems enable integration of provider information, prescription claims, patient information and medical claims to identify links and relationships between individual providers, provider organizations, health plans and accountable care organizations (ACOs), provider networks, and patients. By so doing, profiling and benchmarking of therapeutic class, patient demographics, brand and generic drugs, specialty drugs and compounds, and mail versus retail channel may be performed. Utilization and cost may be identified, thereby enabling optimization of provider networks and ACOs, Medicare and Medicaid opportunities, and fraud, waste, and abuse detection.

Figure 1:
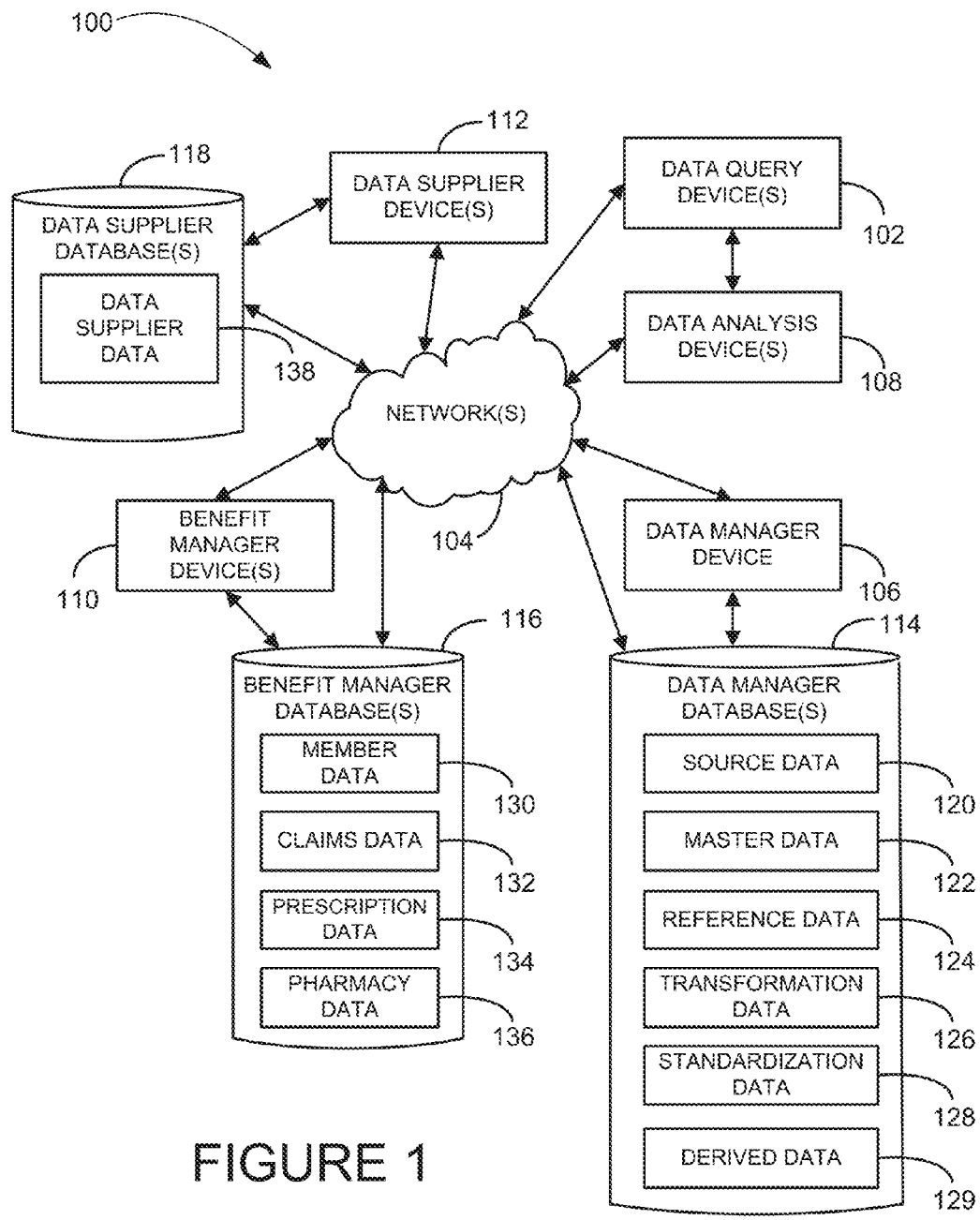
FIG. 1 is a block diagram of an example system, according to an example embodiment.

FIG. 1 is a block diagram of an example system 100, according to an example embodiment. The system 100 is an example embodiment in which data integration may be performed. The system 100 includes a data query device 102 in communication with a data manager device 106 over a network 104. The system 100 may also include a data analysis device 108, a benefit manager device 110, and a data supplier device 112.

The data query device 102 runs a data query, or multiple data queries, on cleaned data to obtain information of interest (e.g., to a query operator of the data query device 102). The query operator is a person that is performing the data query analysis utilizing the data query device 102 for himself or herself, on behalf of an organization with whom the person is employed or otherwise engaged, on behalf of an organization for whom the data query is being provided, pursuant to a device request, or otherwise. In some embodiments, the query operator may utilize the data query device 102 to communicate with an analysis operator (e.g., through the data analysis device 108). In some embodiments, the data query device 102 may operate automatically (e.g., pursuant to a script, pursuant to a learning algorithm, or otherwise).

Examples of the devices 102, 106, 108, 110, 112 include a set-top box (STB), a receiver card, a mobile telephone, a personal digital assistant (PDA), a display device, a portable gaming unit, and a computing system; however other devices may also be used. For example, the devices 102, 106, 108, 110, 112 may include a mobile electronic device, such an IPHONE or IPAD device by Apple, Inc., mobile electronic devices powered by ANDROID by Google, Inc., and a BLACKBERRY device by Research In Motion Limited. The devices 102, 106, 108, 110, 112 may also include other computing devices, such as desktop computing devices, notebook computing devices, netbook computing devices, gaming devices, and the like. Other types of electronic devices may also be used.

The network 104 by which one or more than one of the devices 102, 106, 108, 110, 112 may include, by way of example, Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. The network 104 may also include optical communications. Other conventional and/or later developed wired and wireless networks may also be used. In some embodiments, the network 104 may include proprietary network communication technologies such as secure socket layers (SSL) technology, technology found in a prescribing network (e.g., the electronic prescribing network operated by Surescripts of Arlington, Va.), and the like.

The data manager device 106 manages data that is ultimately queried by the data query device 102. As part of its operations, the data manager device 106 may clean the data that it manages. In some embodiments, the data manager device 106 may be responsible for advance generation of information provided in response to a query. For example, certain profiles or portions of profiles of prescribers, pharmacies, and patients may be created in advance of a query.

The data analysis device 108 is a device that analyzes the data received by the data query device 102. For example, fraud, waste, and abuse analysis may be performed utilizing the data analysis device 108 based on the data received (e.g., from the data query device 102). In some embodiments, the fraud, waste, and abuse analysis may include determining fraudulent submission and/or of adjudication of prescription claims by a pharmacy benefit manager (PBM). The fraud, waste, and abuse may be based on improper provider behavior, member/patient behavior, pharmacy behavior, drug supplier behavior, or the like.

In an example embodiment, the data analysis device 108 may receive the results of a query conducted by the query device 102, in which the results may include cleaned data. The data analysis device 108 may analyze the query results including the cleaned data.

The benefit manager device 110 and/or the data supplier device 112 may provide data to the data manager 106 for cleaning and, when applicable, for querying.

The benefit manager device 110 is a device operated by an entity at least partially responsible for the management of a drug and/or medical benefit program. While the entity operating the benefit manager device 110 is typically a PBM, other entities may operate the benefit manager device 110 either on behalf of themselves, the PBM, or another entity. In some embodiments, the benefit manager that provides the drug benefit may also provide one or more than one additional benefits including a health benefit, a dental benefit, a vision benefit, a wellness benefit, a radiology benefit, a pet care benefit, an insurance benefit, a long term care benefit, a nursing home benefit, and the like.

Some of the operations of the PBM that operates the benefit manager device 110 may include the following. A member (or a person on behalf of the member) attempts to obtain a prescription drug at a retail pharmacy location where the member can obtain drugs in a physical store from a pharmacist or pharmacist technician, or in some instances through mail order drug delivery from a mail order pharmacy location. The prescription drug may otherwise be received through a different delivery channel such as a prescription drug kiosk station.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member and/or a prescription/health/medical benefit plan may directly or indirectly fund or reimburse the member or an account of the member for the co-pay.

The amount of the co-pay paid by the member may vary by the benefit plan of the client with the PBM. The member's co-pay may be based on be a flat co-pay (e.g., $10), co-insurance (e.g., 10%), and/or a deductible (e.g., for first $500 of annual prescription drug spend) for certain prescription drugs, certain types of prescription drugs, and/or all prescription drugs.

In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug.

In conjunction with receiving the co-pay (if any) from the member and dispensing the prescription drug to the member, the pharmacy submits a claim to the PBM for the prescription drug. The PBM may perform certain adjudication operations including verifying the eligibility of the member, reviewing the formulary to determine appropriate co-pay, coinsurance, and deductible for the prescription drug, and performing a drug utilization review (DUR) on the member. The PBM then provides a response to the pharmacy following performance of the aforementioned operations. As part of the adjudication, the client (or the PBM on behalf of the client) ultimately reimburses the pharmacy for filling the prescription drug when the prescription drug was successfully adjudicated. The aforementioned adjudication operations generally occur before the co-pay is received and the prescription drug dispensed. However, the operations may occur simultaneously, substantially simultaneously, or in a different order. In addition, more or less adjudication operations may be performed as part of the adjudication process.

The data supplier device 112 is device that has and/or may provide data regarding a single data category, or multiple data categories, of interest to the data manager device 106. For example, the data supplier device 112 may have data regarding prescribers, pharmaceutical manufacturers, prescription drugs, prescription drug average wholesale price (AWP), co-pays, PBM clients, and the like. In some embodiments, the data may be developed through analysis performed by the data supplier device 112 or by a person or organization that operates the data supplier device 112. In some embodiments, the data may be developed by a single organization, or multiple organizations, and provided to the data supplier device 112. The data developed or obtained by the data supplier device 112 need not be related to prescription drugs, but may be from one, or more than one, data categories of interest to the data manager device 106. In some embodiments, the data supplier operating the data supplier device 112 is a client of the PBM operating the benefit manager device 110 and/or a client of the data manager operating the data manager device 106. In some embodiments, the data supplier operating the data supplier device 112 is a governmental organization.

The system 100 may include a single database, or multiple databases, maintained by respective devices operated by or on behalf one or a number of different persons and/or organizations. The communication may occur directly (e.g., through local storage) and/or through the network 104 (e.g., in a cloud configuration or software-as-a-service) with a device that stores a respective database.

FIG. 1 represents an example deployment of the databases 114, 116, 118 with respective devices 106, 110, 112 respectively. However, the system 100 is not limited to this configuration. The databases 114, 116, 118 may be deployed on the data manager device 106, the data query device 102, the data analysis device 108, the benefit manager device 110, or the data supplier device 112, on more than one of the devices 102, 106, 108, 110, 112, partially on more than one of the devices 102, 106, 108, 110, 112, or may otherwise be deployed. The deployment may occur on local storage, remote storage, removable storage, and/or a different type of storage associated with the devices 102, 106, 108, 110, 112. Additionally, while a single database is depicted for each of the respective databases 114, 116, 118 is shown, multiple databases may be implemented. In the case of multiple databases, the different databases may be deployed on different systems, including the devices 102, 106, 108, 110, 112 and/or a third-party device or network.

The data manager database 114 may store source data 120, master data 122, reference data 124, transformation data 126, standardization data 128, and/or derived data 129. Other data may also be stored within the data manager database 114.

The source data 120 may generally include data to be cleaned and then used as master data 122 in performing claims data processing. The source data 120 may be received from the benefit manager device 110 and/or the data supplier device 112. Thus, the source data 120 may include member data 130 and/or the claims data 132 stored within the benefit manager database 116, and/or the data supplier data 138 stored within the data supplier database 118.

In some embodiments, in addition to including the raw unverified and/or correct data (e.g., healthcare professional information, prescription information, member information, pharmacy information, drug information, or the like), the source data 120 may also include the transformation data 126.

In some embodiments, the source data 120 includes the claims data 132. In some embodiments, the source data 120 links to the claim data 132 (e.g., by linking to the claims data 132 as stored in the database 116).

The master data 122 may include similar data as the source data 120, however the master data 122 may include data that has been verified for correctness, accuracy, and validity. The master data 122 may have been verified by comparing and/or correlating information from various sources, including the member data 130, the claims data 132, the data supplier data 138, as well as verification by internal error correction. Accordingly, the master data 122 may include cleaned member data, cleaned claims data, cleaned provider data, cleaned prescription data, cleaned pharmacy data, or the like, in that the data may be cleaned to remove errors or inaccuracies.

By way of example, the master data 122 may include data attributes for many healthcare providers (such as healthcare provider name, healthcare provider address, healthcare provider professional affiliations, healthcare provider NPI number, or the like), members (such as member name, member address, member date of birth, member healthcare plan identification number, or the like), drugs (such as drug name, drug NDC, brand name, generic name, therapy class, prescription drug average wholesale price (AWP), or the like.), and pharmacies (such as pharmacy name, pharmacy address, pharmacy NPI number, or the like). The information included in the master data 122 may have been verified, or cross-checked, as being correct and accurate. For example, healthcare provider information in the master data 122 may be verified based on comparisons to information obtained from CMS NPI directories, DEA identification updates, PBM provider databases, practitioner state licenses and sanctions databases, previously submitted pharmacy claims, postal service addresses and geocodes, and the like. The information utilized to verify the master data 122 may be received from, for example, the benefit manager database 116, the data supplier database 118, and/or another source. Similarly, pharmacy information in the master data 122 may be verified based on comparisons to information obtained from CMS NPI directories, DEA identification updates, PBM pharmacy databases, practitioner state licenses and sanctions databases, previously submitted pharmacy claims, postal service addresses and geocodes, pharmacy ownership records, and the like. Drug information in the master data 122 may be verified based on comparisons to information obtained from drug product tables, DEA provided information, previously submitted pharmacy claims, and the like. As such, based on the verifications, the information included in the master data 122 may be considered correct and accurate. Accordingly, the information within the master data 122 may be considered clean.

In some embodiments, the master data 122 is in the form of master records. In general, a master record is a collection of data associated with a particular person or entity (e.g., a portion of the master data 122). A master record need not be a specific type of file format, record format, or limiting type of data structure as such, but may refer to the related data for the particular person or entity among a collection of data.

The source data 120 may include as-is data with the same data elements as the master data 122, the master data 122 itself, and all verification data including current and historical verified and edited data.

The reference data 124 may be data associated with master data 122 but that is deemed less significant or valuable. For example, the reference data 124 may include an address that is incorrect or no longer current, while the master data 122 includes an address that is deemed correct and current. The reference data 124 may include erroneous data, data that is out of date, data from a less reliable source relative to the master data 122, or the like.

The transformation data 126 includes data reflecting how to transform or correct the source data 120. The transformation data 126 may be general, data source specific, or otherwise. The transformational data 126 may be included within the source data 120 and/or the master data 122, separately stored in the database 114, or stored as part of a separate data collection, or otherwise.

For example, the transformation data 126 may define a transformation for correcting the differences between the received data attribute of the source data 120 and the data attribute included within the master data 122. The degree and/or nature of the defined transformation may vary depending upon preferences and/or rules. For example, the transformation may include a substitution of the last name included in the received source data 120 with the last name included in the master data 122. Alternatively, the transformation may include a substitution of the "o" in the last name included in the source data 120 with an "i" in the last name included within the master data 122.

The transformation data 126 may include information regarding various transformations that have been made to raw data included within the source data 120 as part of verifying the data and/or correcting the data so that it can be included within the master data 122. In some embodiments, the transformation data 126 may include transformations that may have been defined as generally described above. For example, the transformation data 126 may include particular transformations that were made to raw data attributes to achieved corrected data attributes that may be included within the master data 122.

The transformation data 126 may identify one, or more than one, transformations that may have been made to previously received data attributes that were different than the data attributed included within the master data 122. For example, previously received data (e.g., which may also be stored in the source data 120) may have included a misspellings of the prescribing healthcare professional's last name as "Smuth," "Snith," "Smoth," "Smurh," etc. Corresponding transformation data 126 may include transformations in which the incorrect letter is substituted with the correct letter. Other similar transformation data 126 may be included.

The standardization data 128 includes data reflecting standardized formats including a standardized spelling format, a standardized capitalization format, a wording appearance format, a numbering appearance format, and the like.

The derived data 129 is data created using the master data 122 directly or as an index (e.g., in to the claims data 132) that provides analysis of potential interest. For example, the derived data may include analytical comparative profiles calculated for various healthcare participants.

In some embodiments, the database 114 may include drug data. The drug data may include drug name (e.g., technical name and/or common name), other names by which the drug is known by, active ingredients, an image of the drug (e.g., in pill form), and the like. The drug data may include information associated with a single medication or multiple medications. In some embodiments, the drug data may be stored as a portion of the source data 120.

In some embodiments, the database 114 may include provider data. The provider data may include information regarding prescribers and/or providers of healthcare services. The provider data may include, by way of example, provider name, national provider identifier (NPI) information associated with the providers, location data regarding the location of the providers, information data regarding the provider hours and/or telephone number, provider network association data defining the provider network associations of which the providers are associated, business relations with other providers, services provided by the provider (e.g., prescriptions issued by the provider, treatment services administered by the provider, testing services administered by the provider, etc.), and the like. The providers may be at a physician's office, a hospital, a testing laboratory, a pharmacy, a location associated with a PBM, or the like. In some embodiments, the provider data may be stored as a portion of the source data 120.

In some embodiments, the drug data and/or the provider data may be received from a device (e.g., the benefit manager device 110 from the benefit manager database 116). In some embodiments, the drug data and/or the provider data may be derived from the source data 120. In some embodiments, the drug data and/or provider data are a portion of the master data 122.

The benefit manager device 110 may provide certain member data 130, claims data 132, prescription data 134, and/or pharmacy data 136 from the database 116 for storage in the database 114 as part of the source data 120. The member data 130 may include information regarding members of a pharmacy benefit plan and/or patients of one, or more than one, pharmacy. The member population may be for a single pharmacy benefit plan (e.g., offered on behalf of a single company), or may for multiple pharmacy benefit plans. In general, the member data 130 may include member name, member contact information (e.g., address, telephone number, email address, and the like), and a client identifier that identifies the client associated with the member and/or a member identifier that identifies the member to the client.

The claims data 132 includes information regarding pharmacy claims adjudicated by the PBM under a drug benefit program provided by the PBM for one, or more than one, clients. In general, the claims data 132 may include client data (e.g., including an identification of the client that sponsors the drug benefit program under which the claim is made, company name, company address, contact name, contact telephone number, contact email address, and the like), an identification of the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility. The claims data 132 may also include claims adjudicated for healthcare related services other than prescriptions filled under a drug benefit program. Examples of other healthcare related services may include medical services (such as treatment, screening services, laboratory services), dental related services, and vision care related services. Additional information may be included in the various claims of the claims data 132.

The prescription data 134 may include information regarding prescriptions that may be issued by providers on behalf of patients, who may be members of the drug benefit plan, for example to be filled by a pharmacy. Examples of the prescription data 134 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.)

The pharmacy data 136 may include information regarding pharmacies. The pharmacy data may include, by way of example, national provider identifier information associated with the pharmacies, location data regarding the location of the pharmacies, information data regarding the pharmacy hours and/or telephone number, pharmacy network association data defining the pharmacy network associations of which the pharmacies are associated, and the like.

The data supplier data 138 as may be stored in the database 118 may include the member data 130, the claims data 132, clinical data, provider data, drug data, the prescription data 134, and/or the pharmacy data 136. The member data 130 and the claims data 132 may be for a same member population as maintained by the benefit manager operating the benefit manager device 110, or for a different population. In some embodiments, the source data 120 is stored separately from the member data 130, claims data 132, and/or data supplier data 138.

The clinical data may include clinical records regarding member diagnosis and/or therapy. The clinical data may be obtained from hospitals, medical insurance companies, drug trials, medical laboratories in the form of clinical records and/or the member via online questionnaires, for example. In some embodiments, the clinical data includes medical claims and/or lab data. In some embodiments, the clinical data includes medication data (e.g., for a claim made under the medical benefit instead of the prescription drug benefit).

By way of example, a member of a healthcare benefit program, such as a drug benefit program, may request a drug prescription be filled by a pharmacy, such as a retail pharmacy or a mail order pharmacy. When the member requests that the drug prescription be filled by the pharmacy, the pharmacy may submit a drug prescription claim, to the benefit manager of the healthcare benefit program (such as the drug benefit program as operated by a PBM). The prescription drug claim may be submitted to the PBM for adjudication to determine eligibility of the member for coverage of the prescription under the drug benefit program, a required co-pay to be paid by the member, a reimbursement to the pharmacy, etc. The data associated with the prescription drug claim may be stored in one, or more than one, of the member data 130, and the claims data 132. In some embodiments, receiving the data may include accessing the member data 130 and/or the claims data 132 stored within benefit manager database 116.

By way of example, a prescription drug claim may, for example, identify the member requesting the fill of the drug prescription, the pharmacy at which the request to fill the drug was made, a drug benefit plan identifier, an identification of the drug to be filled, and an identification of the prescribing healthcare provider, such as a doctor or other prescriber. The member may be identified by one or more of a member name, member identification (e.g., an identification number use to identify the member with respect to the drug benefit program), a member address, a date of birth, as well as other information. Similarly, the pharmacy may be identified by a pharmacy name, an address, a national provider identifier (NPI) number, etc. The drug to be filled (or that has been filled) may be identified by one or more of a drug name, a brand name, a generic name, a therapy class, a national drug code, a dosage, a form of the drug, or other information. The prescribing healthcare professional may be identified by, for example, name, addresses, professional affiliation (e.g., a healthcare provider organization, such as a medical practice), an NPI number, DEA number, or other identifying information. Each piece of information (e.g., member name, member date of birth, pharmacy NPI number, pharmacy address, drug name, drug NDC, prescriber NPI number, prescriber name, etc.) may each be an attribute of the claims data 132 for a particular prescription drug claim.

As generally described above, a device operator of the data query device 102 may utilize the data query device 102 to run a data query, or multiple data queries, on the cleaned master data 122 to obtain information of interest (e.g., to the device operator of the query device 102 or to another individual or device). Further, a device operator of the data analysis device 108 may perform a data analysis of the query results of the query run on the data query device 102, which includes cleaned master data 122. The device operator of the data analysis device 108 may perform the data analysis for himself, on behalf of an organization with whom the device operator is employed, or on behalf of an organization for whom the data analysis is being provided. In some embodiments, the device operator of the data query device 102 and the device operator of the data analysis device 108 may be the same person, or may be different people. Further, in some embodiments, the device operator of the data query device 102 and the device operator of the data analysis device 108 may be employed by the same organization and/or may act on behalf of the same person or the same organization.

Various different types of data analysis may be performed by the data analysis device 108 on cleaned master data 122 received by the data query device 102. For example, fraud, waste, and abuse analysis, cost verification, member verification, provider investigation, drug utilization and the like may be performed utilizing the data analysis device 108 based on the cleaned data received by the data analysis device 108.

While the system 100 in FIG. 1 is shown to include single devices 102, 106, 108, 110, 112 multiple devices may be used. The devices 102, 106, 108, 110, 112 may be the same type of device or may be different device types. When multiple devices are present, the multiple devices may be of the same device type or may be a different device types. Functionality of some or all of the devices 102, 106, 108, 110, 112 may be combined into a lesser number of devices, or may be spread among a greater number of devices. For example, the functionality of devices 102, 106, 108, 110, 112 may be combined into a single device.

Moreover, system 100 shows a single network 104, however, multiple networks can be used. The multiple networks may communicate in series with each other to link the devices 102, 106, 108, 110, 112 or in parallel to link the devices 102, 106, 108, 110, 112.

The devices 102, 106, 108, 110, 112 may be in a client-server relationship with one another, a peer-to-peer relationship with one another, in a different type of relationship with one another, or in a combination of different types of relationships with one another.

The person(s) and/or organization(s) operating the devices 102, 106, 108, 110, 112 may be the same person or organization, or may be operated by different persons or organizations.

By way of example, a pharmacy benefit manager operating the benefit manager device 110 may operate the data manager device 106. A licensee of the benefit manager may utilize the data query device 102 to perform data queries against the master data 122 maintained in the data manager database 114 by the data manager device 106. The licensee may use the results of the query in its operation of the data analysis device 108.

Figure 2:
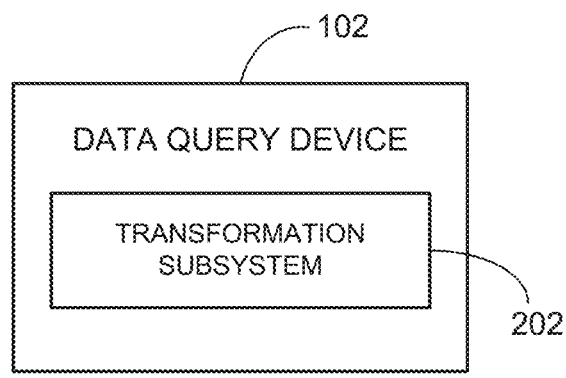
FIG. 2 is a block diagram of an example data query device that may be deployed within the system of FIG. 1, according to an example embodiment.

FIG. 2 illustrates the data query device 102, according to an example embodiment. The data query device 102 may include a transformation subsystem 202. The transformation subsystem 202 may enable data integration. The data query device 102 may be deployed in the system 100, or may otherwise be used.

Figure 3:
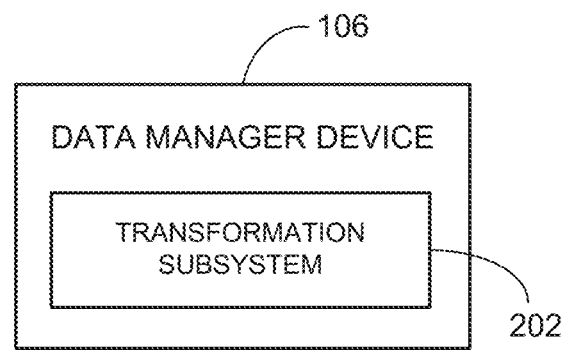
FIG. 3 is a block diagram of an example data manager device that may be deployed within the system of FIG. 1, according to an example embodiment.

FIG. 3 illustrates the data manager device 106, according to an example embodiment. The data manager device 106 may include the transformation subsystem 202. The transformation subsystem 202 may enable data integration. The data manager device 106 may be deployed in the system 100, or may otherwise be used.

By way of example, the transformation subsystem 202 may be deployed in the data query device 102, the data manager device 106, or both the data query device 102 and the data manager device 106. In some embodiments the transformation subsystem 202 may provide server-side functionality for the data query device 102. The data query device 102 may then perform some of the functionality while other functionality is performed by the data manager device 106.

Figure 4:
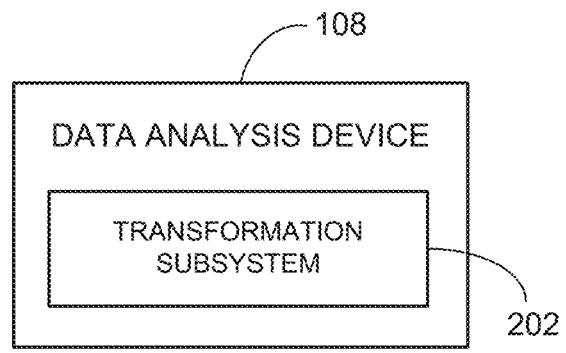
FIG. 4 is a block diagram of an example data analysis device that may be deployed within the system of FIG. 1, according to an example embodiment.

FIG. 4 illustrates the data analysis device 108, according to an example embodiment. The data analysis device 108 may be used by a device operator to enable data integration. The data analysis device 108 may be deployed in the system 100, or may otherwise be used. The data analysis device 108 may include the transformation subsystem 202.

Figure 5:
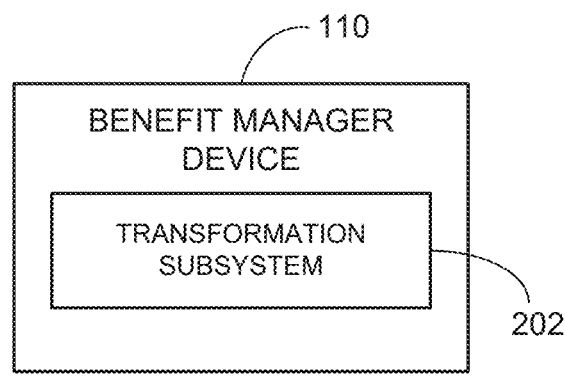
FIG. 5 is a block diagram of an example benefit manager device that may be deployed within the system of FIG. 1, according to an example embodiment.

FIG. 5 illustrates the benefit manager device 110, according to an example embodiment. The benefit manager device 110 may be used by a device operator to enable data integration. The benefit manager device 110 may be deployed in the system 100, or may otherwise be used. The benefit manager device 110 may include the transformation subsystem 202.

Figure 6:
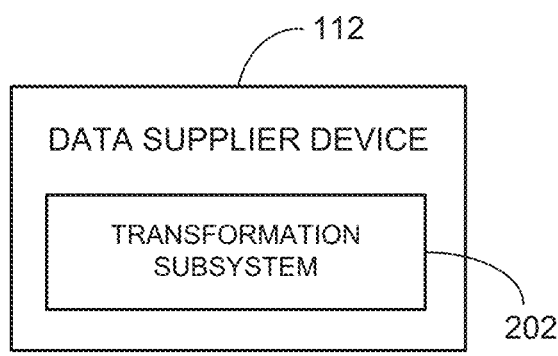
FIG. 6 is a block diagram of an example data supplier device that may be deployed within the system of FIG. 1, according to an example embodiment.

FIG. 6 illustrates the data supplier device 112, according to an example embodiment. The data supplier device 112 may be used by a device operator to enable data integration. The data supplier device 112 may be deployed in the system 100, or may otherwise be used. The data supplier device 112 may include the transformation subsystem 202.

Figure 7:
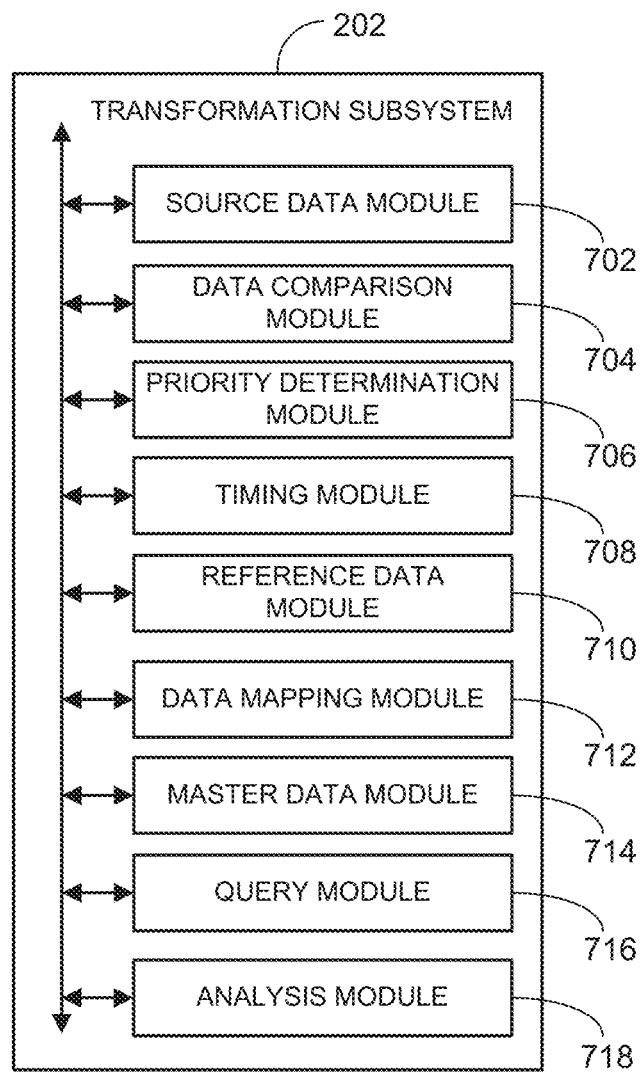
FIG. 7 is a block diagram of an example transformation subsystem that may be deployed within the query device of FIG. 2, the data manager device of FIG. 3, the data analysis device of FIG. 4, the benefit manager device of FIG. 5, or the data supplier device of FIG. 6, according to an example embodiment.

FIG. 7 illustrates an example transformation subsystem 202 that may be deployed in the data query device 102, the data manager device 106, the data analysis device 108, the benefit manager device 110, the data supplier device 112, or otherwise deployed in another system. One or more modules are communicatively coupled and included in the transformation subsystem 202 to enable claims data processing. The modules of the transformation subsystem 202 that may be included are a source data module 702, a data comparison module 704, a priority determination module 706, a timing module 708, a reference data module 710, a data mapping module 712, a master data module 714, a query module 716, and an analysis module 718. Other modules may also be included.

In some embodiments, the modules of the transformation subsystem 202 may be distributed so that some of the modules are deployed in one of the devices 102, 106, 108, 110, 112 and other modules are deployed one or more of the devices 102, 106, 108, 110, 112. In one embodiment, the modules are deployed in memory and executed by a processor coupled to the memory. The functionality contained within the modules 702-718 may be combined into a lesser number of modules, further divided among a greater number of modules, or redistributed among existing modules. Other configurations including the functionality of the modules 702-718 may be used.

The source data module 702 stores the source data 120 received from a data source and compares the source data 120 against the master data 122. The source data 120 may be received from a single data source or multiple data sources. Examples of data sources include the benefit manager devices 110 and the data supplier devices 112. Examples of data that the source data module 702 may store as the source data 120 include the member data 130, the claims data 132, the prescription data 134, the pharmacy data 136, and the data supplier data 138. The source data 120 may include information about a particular healthcare participant (e.g., information about a member of a prescription drug plan), or may include information about multiple healthcare participants (e.g., a prescription drug claim including information about a member of a prescription drug plan, a pharmacy that filled the prescription drug claim for the member, and a prescriber that prescribed the prescription drug of the prescription drug claim).

In some embodiments, the master data 122 used to compare against the source data 120 is in the form of master records. Examples of master records include prescriber records, pharmacy records, and patient records. In general, each master record is associated with a specific healthcare participant (e.g., a person or an entity).

In some embodiments, the source data module 702 determines that there is no standardized format for the data source. When such a determination has been made, source data 120 that is not in such a format may be transmitted to a device (e.g., the device manager device 106) for manual processing. At manual processing, an operator may determine how to modify or otherwise handle such source data 120. In some embodiments, a device may suggest to the operator the possible changes that may be made (e.g., based on data analytics, past selections, or otherwise). Once manual processing is complete, the device transmits back to the source data module 702 the standardized format for the data source.

Thereafter, the source data module 702 may, based on receipt of a transmission or from previously stored information, be able to process nonmatching source data by being able to process it into a standardized format. The standardized format may include, by way of example a standardized spelling format, a standardized capitalization format, a wording appearance format, a numbering appearance format, or the like. The standardizations may be specific to a person or entity, or may be generally applicable across a number of people or entities.

In some embodiments, the source data module 702 identifies a source data provider associated with the comparison data and determines whether a source data import from the source data provider has previously been performed. When a determination is made that the source data import has previously been performed, the source data module 702 selects the standardized format and the standardized field splits format associated with the source data provider. In some embodiments, the source data module 702 receives a source data transformation to correct a portion of the source data and corrects a portion of the source data with the source data transformation to create a source data portion. While the foregoing generally describes that the formatting of a data source is available based on past usage, the formatting of a data source can change such that additional standardization may be used.

In some embodiments, the source data module 702 defines the transformation by comparing the data attributes included within the received data and the corresponding data attributes included within the master data 122, and identifying differences between the attributes, and further identifying modifications necessary to transform the received data attribute to the data attribute included within the master data 122. Various additional and/or alternative levels of transformation granularity and/or types of transformation may be equally utilized. Further, while a transformation to a last name of a prescribing healthcare professional may be used for example, related transformations may be applied to other data attributes.

In some embodiments, identifying a transformation to correct the difference between the one or more than one attributes of the received data and the data attribute included in the master data 122 by the source data module 702 may include accessing transformation data 126 that reflects multiple data transformations in the source data 120 and the master data 122. For example, the source data 120 may include a collection of data that may be unverified and/or uncorrected, including incorrect data, data with errors, etc., as well as data that may be correct. Further, the source data 120 may include various transformations (e.g., as the transformation data 126) to the unverified and/or uncorrected data that may have been made as a result of verifying or correcting the data. The source data 120 may include data received as claims data 132 (e.g., submitted pharmacy claims, or other claims submitted for coverage and/or reimbursement under a healthcare benefit program), professional licensing data received from profession or state licensing or certification agencies, national provider identifier information, DEA information, drug information received from pharmaceutical companies, financial data received from various sources, etc., as well as various additional and/or alternative information. It will be appreciated that much of the source data 120 may include at least the possibility of inaccuracies, or incorrect data. Once data within the source data 120 has been verified and/or corrected, (e.g., based on additional data sources that may provide verification and/or based on transformations to correct the data to a verified form) the data may be stored within the master data 122, which may include verified and/or corrected data and, in some embodiments, may be in the form of master records.

In an example embodiment, identifying transformation data 126 relevant to the received data may include identifying transformation data 126 that is relevant to the data attribute of the received source data that is different from the data attribute of the master data 122. For example, the source data module 702 may access transformation data 126 (e.g., by a query to the database 114) relative to the term "Smoth" as a last name. In response to the query, search results for transformation data 126 relative to the term "Smoth" as a last name may identify a transformation including substituting the "o" with an "i." Such a transformation may further be identified as remedying the difference between the received data attribute and the attribute included within the master data 122.

By way of example, a difference including a typographical error has been described. Various additional and/or alternative differences in data attributes may exist. For example, information included in the data attribute may have been updated or changed, and may therefore have no similarity. In an example embodiment, identifying transformation data 126 may include identifying an indication that the data attribute has changed. Similarly, transformation data 126 may include transpositions of numbers or letters, common substitutions (e.g., Jack being a known equivalent of John, Jon being a known shortening of Jonathan, etc.), abbreviations, truncations, etc. At least a portion of such transformation data 126 may be derived over time. However, in some cases at least a portion of the transformation data 126 may be algorithmically contemplated (e.g., truncations, transpositions), and/or may be accounted for through the use of transformation rules (e.g., Jack is equivalent to John, etc.).

The source data module 702 compares the source data 120 against the master data 122 to identify matching source data and nonmatching source data among the source data 120. In some embodiments, the source data module 702 compares the source data 120 by respectively comparing source data identifiers with master record identifiers of the master data 122. When a source data identifier matches a master record identifier, the source data module 702 identifies a corresponding portion of the source data 120 that is associated with the source data identifier as being matching source data. For example, if an NPI of a prescriber included in the source data 120 matches the NPI of a prescriber included in the master data 122, the applicable portion of the source data will be deemed to match the applicable portion (e.g., a master record) of the master data 122. When a source data identifier is missing, blank, or similar (e.g., with some characters missing, transposed, etc.) and a portion of remaining data attributes of the source data portion matches a corresponding portion of the available master record, the source data module 702 identifies the source data portion as being matching source data. Thus, in this example, the portion of the source data 120 is matched to the master data 122 despite not having matching identifiers. When the source portion of the source data has not otherwise been identified as being matching source data, the source data module 702 identifies the source data portion as being nonmatching source data.

Examples, of the source data identifier and the master record identifiers used for the comparison include NPI, a telephone number, an address, or combinations thereof. However, other data attributes may be used alone or in combination with other data attributes for the comparison.

Once the data is received and made capable of matching by the source data module 702, the data comparison module 704 respectively compares data attributes of a portion of the source data 120 or comparison data and the data attributes of a portion of the master data 122 or a master record to determine that there is a difference. The difference, after operations performed by the source data module 702, ultimately indicates that the underlying aspects of the data in the source data 120 is not the same as the corresponding master data 122. In some embodiments, other operations are performed by the priority determination module 706 and/or the timing module 708 to identify which version of the data (e.g., the version associated with the source data 120 or the version associated with the master data 122) is deemed to be more valuable (e.g., correct).

By way of example, the data comparison module 704 may compare one or more than one attributes of the received data with attributes of data within the master data 122 by, for example, include comparing various attributes of the source data 120 with corresponding attributes of the master data 122. For example, the master data 122 may include a healthcare professional record that may include, as data attributes, the name of a healthcare professional, that healthcare professional's address, that healthcare professional's professional affiliations, and that healthcare professional's NPI number. Accordingly, comparing the one or more healthcare professional attributes included in the received data (e.g., the name of the prescribing healthcare professional, the address of the prescribing healthcare professional, and the NPI of the prescribing healthcare professional) with the corresponding data attributes for the healthcare professional included in the master data 122. For example, the transformation subsystem 202 may access a healthcare professional record within the master data 122 based on the NPI number of prescribing healthcare professional included in the claims data 132.

By way of example, the data comparison module 704 may identify one or more than one differences between a data attribute of the received source data and a corresponding data attribute within the master data 122. For example, the received data may identify the prescribing healthcare professional as Dr. Tom Smoth having a particular NPI number. However, the healthcare professional record within the master data 122 for the particular NPI number may identify the healthcare professional as Dr. Tom Smith. As such, for the particular NPI number, the last name of the healthcare professional indicated in the received data may be different than the last name of the healthcare professional indicated in the master data 122. Similar differences may be identified in other data attributes (e.g., different healthcare professional address, different professional affiliations, etc.). Additionally, in response to identifying a difference in the last name of the healthcare professional for the particular NPI number, the data comparison module 704 may also access a healthcare professional record within the master data 122 based on the healthcare provider having a last name of Smoth, as indicated by the claims data attribute. The data comparison module 704 may similarly access a healthcare professional record within the master data 122 based on other attributes (e.g., healthcare professional address, etc.).

In a situation in which the NPI number included in the received data may match a NPI number for a healthcare professional record included within the master data 122, the first name of the healthcare professional included in the received data may match the first name of the healthcare professional in the master data 122 for the particular NPI number, the address included in the claims data may match the address of the healthcare professional included in the master data 122 for the particular NPI number, etc., the data comparison module 704 may identify a difference including the last name of the prescribing healthcare professional. While the foregoing example relates to a situation in which the NPI number of the prescribing healthcare professional in the received data matches a healthcare professional record included within the master data 122, it will be appreciated that similar situations may occur, e.g., in which a first name and address of the healthcare professional in the received data may match a first name and address in a healthcare professional record in the master data 122, but the corresponding NPI number and last name in the received data may not match the NPI number and last name in the healthcare professional record in the master data 122. As such, the data comparison module 704 may identify differences between the received data attributes and data attributes of the master data 122 including the NPI number of the prescribing healthcare professional and the last name of the prescribing healthcare professional.

In addition to the prescribing healthcare professional, the data comparison module 704 may compare one, or more than one, attribute of the received data to corresponding attributes included within the master data 122. For example, member name, address, date of birth, member number, etc., included in the received data may be compared to member name, address, date of birth, member number, etc., of a member record included within the master data 122. In a similar manner as described above, any differences between the member data attributes included in the received data and member data attributes included within the master data 122 may be identified. Similar comparison may be made relative to other data attributes, such as drug attributes, pharmacy attributes, etc., with any differences in data attributes being identified.

In an example embodiment, the data comparison module 704 may further identify a transformation to correct the difference between the one, or more than one, attributes of the received data and the data attribute included in the master data 122. For example, in the above-example the last name data attribute for the prescribing healthcare professional included in the received data (e.g., Smoth) was different than the last name data attribute for the prescribing healthcare professional in the master data 122 (e.g., Smith), for example, based on a match of one or more of the NPI number, the addresses, etc., of the prescribing healthcare professional in the received data and the master data 122. Accordingly, the data comparison module 704 may identify a transformation including an alteration to the last name of the prescribing healthcare professional.

The priority determination module 706 determines whether the source of the portion of the source data 120 or the source of the portion of the master data 122 is higher or otherwise deemed more important. For example, the priority determination module 706 may determine a relative level of source priority of the data source of the comparison data relative to the data source of a current state version of the master record in accordance with source evaluation criteria. The source evaluation criteria may be criteria set by a person associated with the data manager device 114, automatically based on past analysis of correctness of data received from previous data sources, or otherwise. The source evaluation criteria may identify the relative importance of the data sources, such that certain data updates from higher priority data sources can supplant existing master data 122 when different and other data updates from lower priority data sources cannot supplant existing master data 122. For example, the source evaluation criteria may indicate that a manual edit to the master data has the highest priority and that.

The timing module 708 determines whether portion of the source data 120 or the portion of the master data 122 is newer. For example, the timing module 708 may identify a date associated with the comparison data and determine whether the date associated with the comparison data is more current than the date associated with the current state version of the master record.

Assuming that there is data difference between a portion of the source data 120 (e.g., as may correspond to a record of a prescriber, pharmacy, or prescriber) and a corresponding portion of the master data 122, then based on the priority determined by the priority determination module 706 and/or timing determined by the timing module 708, the transformation subsystem 202 may take certain actions with respect to the source data 120 and the master data 122. The portion of the source data 120 may be stored in the master data 122 such that it is deemed most significant or valuable or may be stored in the reference data 124 when it is not deemed most significant or valuable.

In some embodiments, the reference data module 710 stores the current state version of the portion of the master data 122 in the reference data 124 based on a determination that there is a difference and that the source priority of the data source of the comparison data is equal to or greater than the data source of the current state version of the master record. In some embodiments, the reference data module 710 stores the comparison data in the reference data 124 based on a determination that there is a difference and that the source significance of the data source of the comparison data is less than the data source of the current state version of the master record.

The source data 120 may not be usable as received from the data source. The data mapping module 712 may include operations to enable the comparison or source data to update the master data 122 or be stored as reference data 124. In some embodiments, the data mapping module 712 formats the comparison or source data in accordance with a standardized format to create formatted comparison or source data, splits the data in accordance with a standardized field splits format, and maps the formatted data into data fields based on the standardized field splits format to create the mapped comparison or source data. The mapped comparison or source data may include, by way of example, a name, an address, and/or a taxonomy code.

In general, the mapped comparison is in a format that may be readily compared against the master data 122. The master data module 714 uses mapped comparison or source data to update the current state version of the master data 122 (e.g., the master record) based on the determination that there is a difference and that the source significance of the data source of the comparison data is equal to or greater than the data source of the current state version of the master data 122 to create an updated state version of the master record.

In some embodiments, storing the current state version of the master data 122 in the reference data 124 and using the mapped comparison data to update the current state version of the master data 122 are further based on the date associated with the comparison data is more current than the date associated with the current state version of the master data 122.

In some embodiments, the reference data module 710 determines that that comparison data is previously stored in the reference data 124 as mapped comparison data. This information may then be promoted from the reference data 124 to the master data 122. The master data module 714 may then use the mapped comparison data to update the current state version of the master data 122.

By utilization of some or all of the foregoing modules, the transformation subsystem 202 maintains master data 122 (e.g., in the form of master records or otherwise) on various healthcare participants. This data may then be used (e.g., by the query module 716, the analysis module 718, or otherwise) to process queries (e.g., generating profiles on certain healthcare participants), in linking in whole or in part (e.g., particular data elements) of prescription drug claims, medical claims, and/or lab data, in creating profiles, for benchmarking, or otherwise.

In some embodiments, the query module 716 receives interface query data data specifying an attribute regarding a healthcare participant. The query may be corrected prior to or during its operation. The query may be performed across provider category, specialty, or sub specialty. The output from one or more than one query may be used for generation of new search queries by the query module 716.

In some embodiments, the query module 716 receives a profile request for a prescriber, a pharmacy, or a patient, selects the updated state version of the master data 122 based on receipt of the profile request, and generates output such as a user interface or display including at least a portion of the updated state version of the master data 122. The profiles may be created, or generated, by using the master data 122 and, in some embodiments, in combination with other data such as the claims data 132.

In some embodiments, the transformation subsystem 202 enables cross-referencing and aggregating of source data 120 in the form of the master data 122. For example, the name, address, NPI number, DEA number, or the like of a healthcare professional may be cross-referenced with one another as being data attributes of a healthcare professional. Similarly, prescriptions made by the healthcare professional may be cross-referenced with the healthcare professional. Similarly, members receiving the prescriptions may cross-reference the prescriptions and the healthcare professional who prescribed the drug. The healthcare professional, diagnoses, medical procedures, and the member may be cross-referenced with the drugs prescribed. Other information included within the source data 120 and/or the master data 122 may be similarly cross-referenced. As such, the information included within one or more of the source data 120 and/or the master data 122 may be searched by the query module 716 based on any included attribute and filtered to show relationships with any other included attributes.

When a search query is received, the query module 716 may compare various attributes of the search query with the data in the master data 122, e.g., to correct any errors in the search query. For example, a search query may be received including a query attribute for a provider having a particular NPI number and a last name of "Smoth." Comparison of the received query and the information included within the master data 122 may indicate that the particular NPI number is associated with a provider having a last name of "Smith." Accordingly, the query module 716 may correct the received query and execute a search over the master data 122 for a provider having the particular NPI number and a last name of "Smith," based upon, at least in part, the cleansed data included within the master data 122. Similarly, the query module 716 may apply any transformations stored in the transformation data 126 relative to the particular NPI number and/or to the last name "Smoth" to the received query. In such an embodiment, the search query may be corrected to include the particular NPI number and the last name "Smith," based upon, at least in part, one or more than one saved transformation The analysis module 718 may be used to benchmark, to assess prescribing practice, dispensing provider behavior, patient behavior or for other analysis based on the creation of the master data 122 and/or association of the master data 122 with the source data 120 (e.g., such as prescription drug claims stored as a portion of the source data 120).

In some embodiments, the analysis module 718 may build a table for each provider that is benchmarked against specialty and sub-specialty relative to a peer group with a state and/or nationwide or geographic definitions. The analysis module 718 may then enable narrowing on providers that are outliers to identifying cost saving and utilization improvement opportunity. The resulting data may be stored as the derived data 129 in the database 114.

Figure 8:
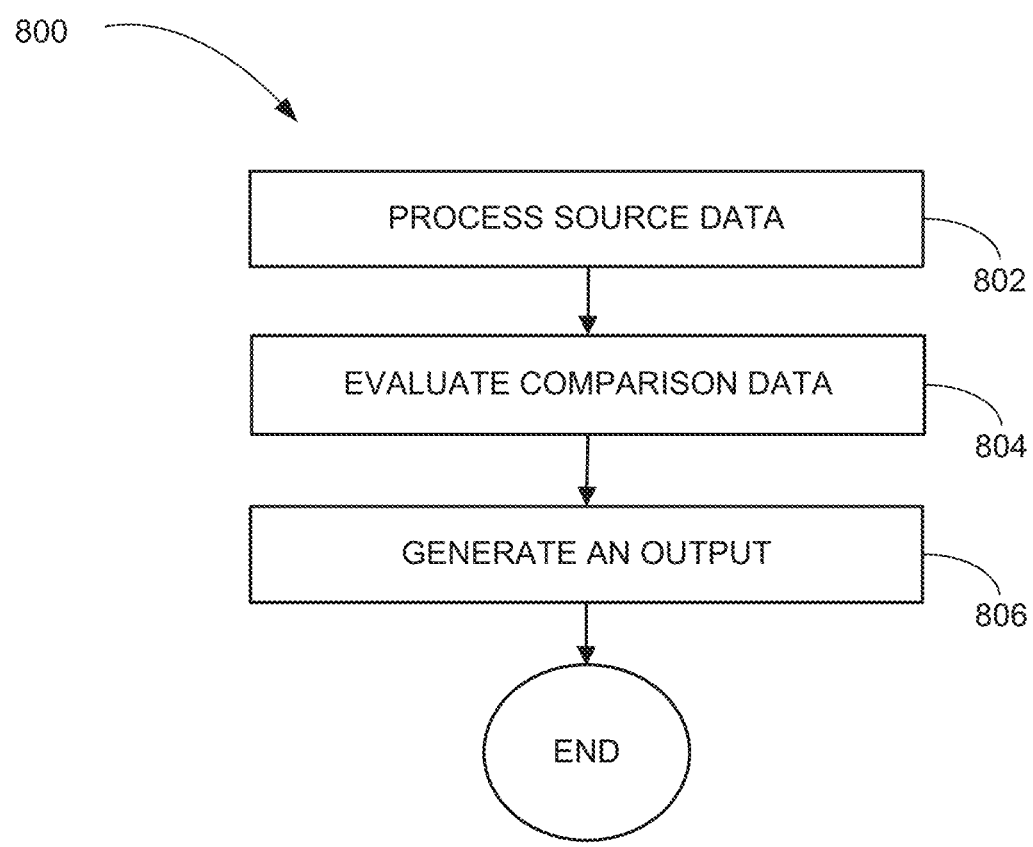
FIG. 8 is an example process flow illustrating a method for data processing, according to an example embodiment.

FIG. 8 illustrates an example method 800 for data processing, according to an example embodiment. The method 800 may be performed by the data query device 102, the data manager device 106, the data analysis device 108, the benefit manager device 110, the data supplier device 112, partially by one of the devices 102, 106, 108, 110, 122 and partially by one or more than one of the devices 102, 106, 108, 110, 122, or may be otherwise performed.

At block 802, received source data 120 may be processed. Processing the source data 120 may include cleansing the source data 120 so that it can be readily compared. The processed data, as comparison data, may be evaluated at block 804. As a result of the comparison, the master data 122 may be updated to reflect information deemed more valuable. An output such as a display may be generated at block 806. The output may rely on portions of the master data 122 to render a display including portions of the master data 122, utilize the master data 122 as an index into certain prescription drug claims or other health information, or otherwise. Other types of outputs including hardcopy may be generated at block 806 instead of or in addition to the display.

Figure 9:
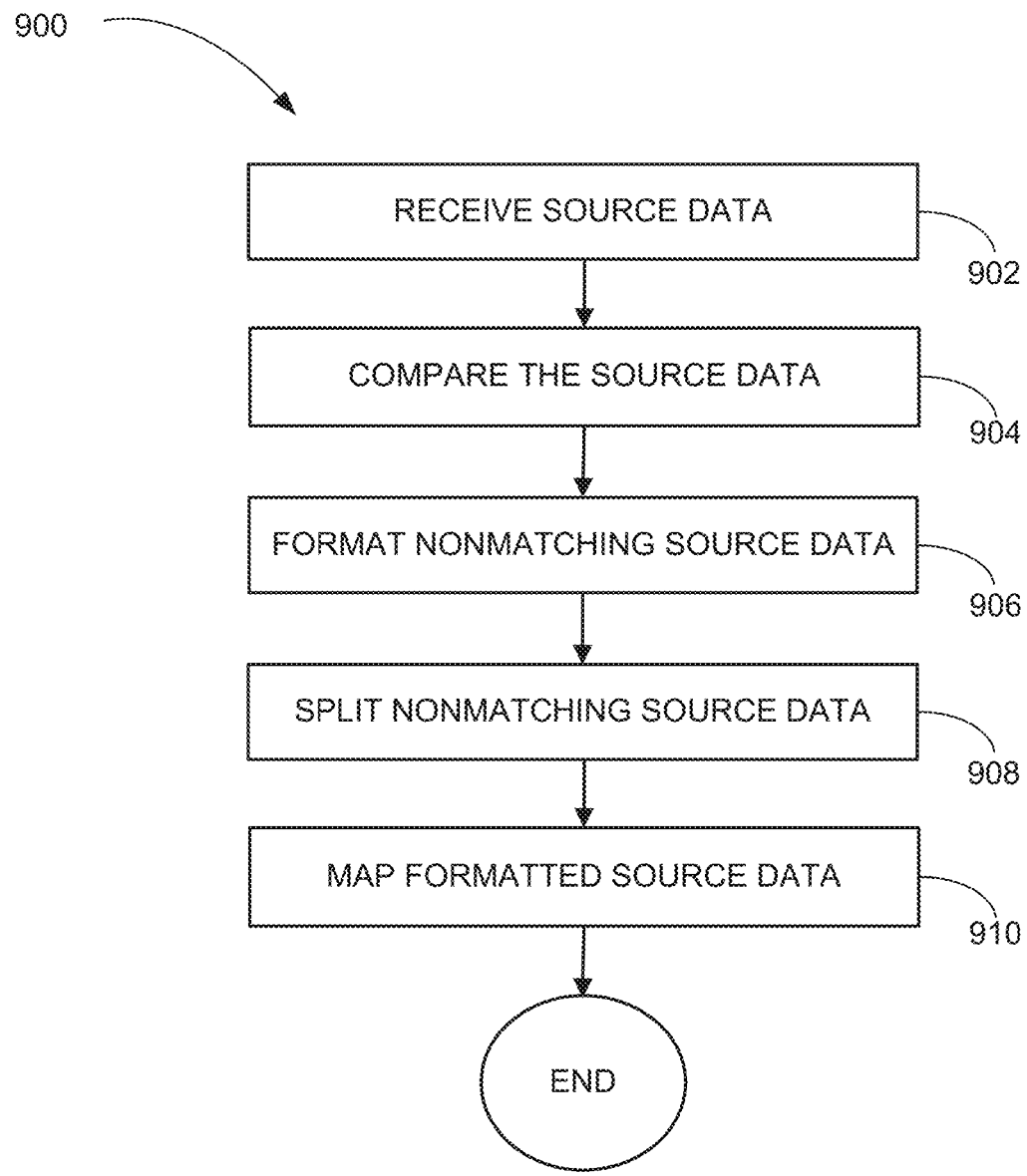
FIG. 9 is an example process flow illustrating a method for processing source data, according to an example embodiment.

FIG. 9 illustrates an example method 900 for processing source data, according to an example embodiment. The operations performed at block 802 (see FIG. 8) may include operations performed by the method 900. The method 900 may be performed by the data query device 102, the data manager device 106, the data analysis device 108, the benefit manager device 110, the data supplier device 112, partially by one of the devices 102, 106, 108, 110, 122 and partially by one or more than one of the devices 102, 106, 108, 110, 122, or may be otherwise performed.

At block 902, the source data 120 received from the data source is stored (e.g., in the database 114).

The source data 120 is compared at block 904 against available master records to identify matching source data and nonmatching source data among the source data 120. The available master records include the master record.

The nonmatching source data is formatted in accordance with a standardized format at block 906 to create formatted source data.

At block 908, the nonmatching source data is split in accordance with a standardized field splits format.

The formatted source data is mapped into data fields based on the standardized field splits format at block 910 to create the mapped source data. The mapped source data includes the comparison data.

In some embodiments, a determination is made that there is no standardized format for the data source, nonmatching source data is transmitted to a manual processing device, and a transmission is received including the standardized format from the manual processing device. The nonmatching source data may then be formatted in accordance with the standardized format based on receipt of the transmission.

Figure 10:
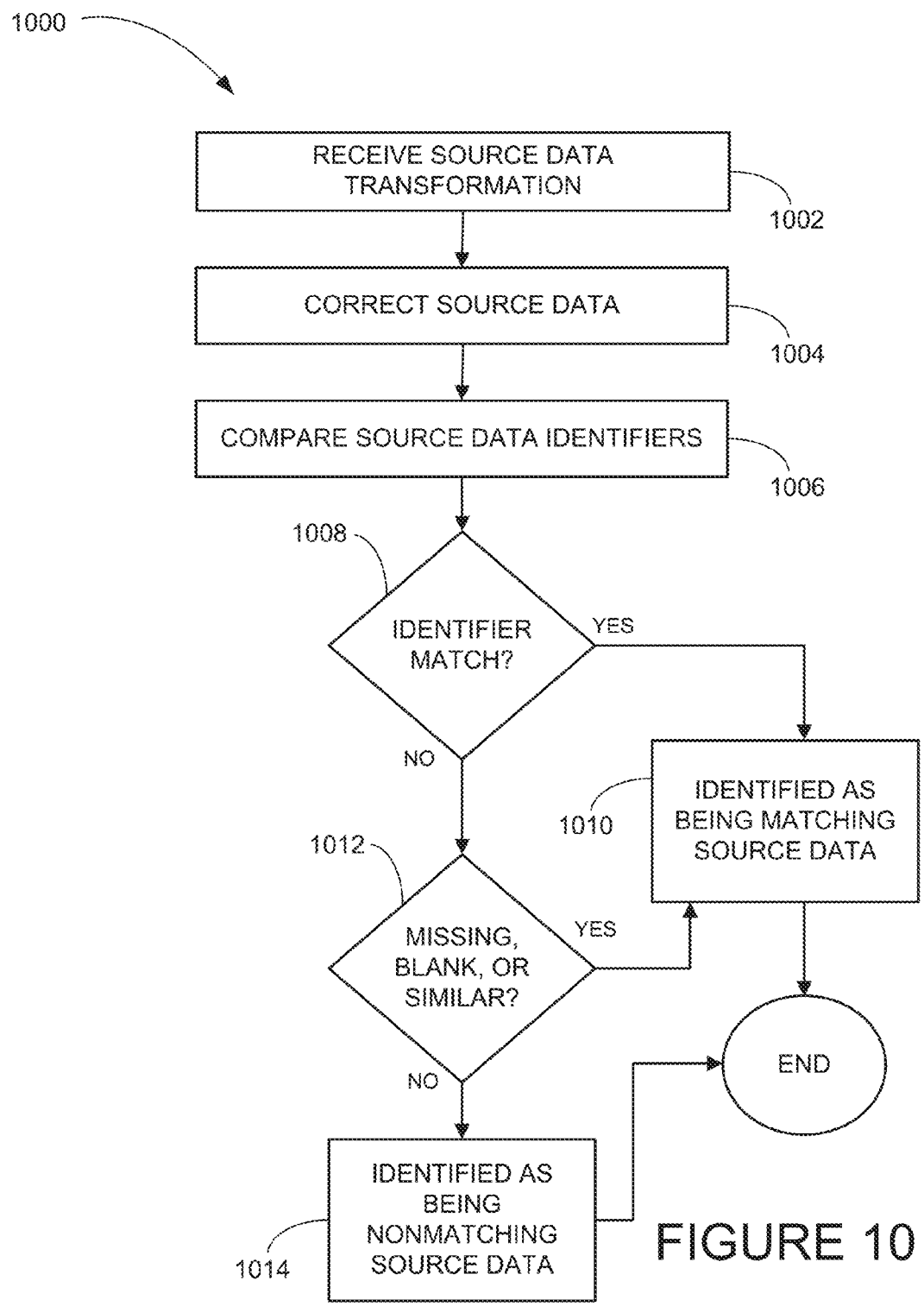
FIG. 10 is an example process flow illustrating a method for source data comparison, according to an example embodiment.

FIG. 10 illustrates an example method 1000 for source data comparison, according to an example embodiment. The operations performed at block 904 (see FIG. 9) may include operations performed by the method 1000. The method 1000 may be performed by the data query device 102, the data manager device 106, the data analysis device 108, the benefit manager device 110, the data supplier device 112, partially by one of the devices 102, 106, 108, 110, 112 and partially by one or more than one of the devices 102, 106, 108, 110, 112, or may be otherwise performed.

In some embodiments, a source data transformation is received at block 1002 to correct a portion of the source data. A portion of the source data is corrected at block 1004 with the source data transformation to create the source data portion.

Source data identifiers are respectively compared with master record identifiers of master record data at block 1006. The master record data includes the available master records.

At decision block 1008, a determination is made as to whether a source data identifier matches a master record identifier. If a determination is made that the source data identifier matches the master record identifier, a source data portion associated with the source data identifier is identified as being matching source data at block 1010. If a determination is made at decision block 1008 that the source data identifier does not match the master record identifier, the method 1000 proceeds to decision block 1012.

At decision block 1012, a determination is made as to whether a source data identifier is missing, blank, or similar but not matching while at least a portion of remaining data attributes of the source data portion to a corresponding portion of the available master record. If a determination is made that the source data identifier is missing, blank, or similar but not matching, a source data portion associated with the source data identifier is identified as being matching source data at block 1010. If a determination is made at decision block 1012 that the source data identifier is not missing, blank, or similar but not matching, the source data portion is identified as being nonmatching source data at block 1014.

Figure 11:
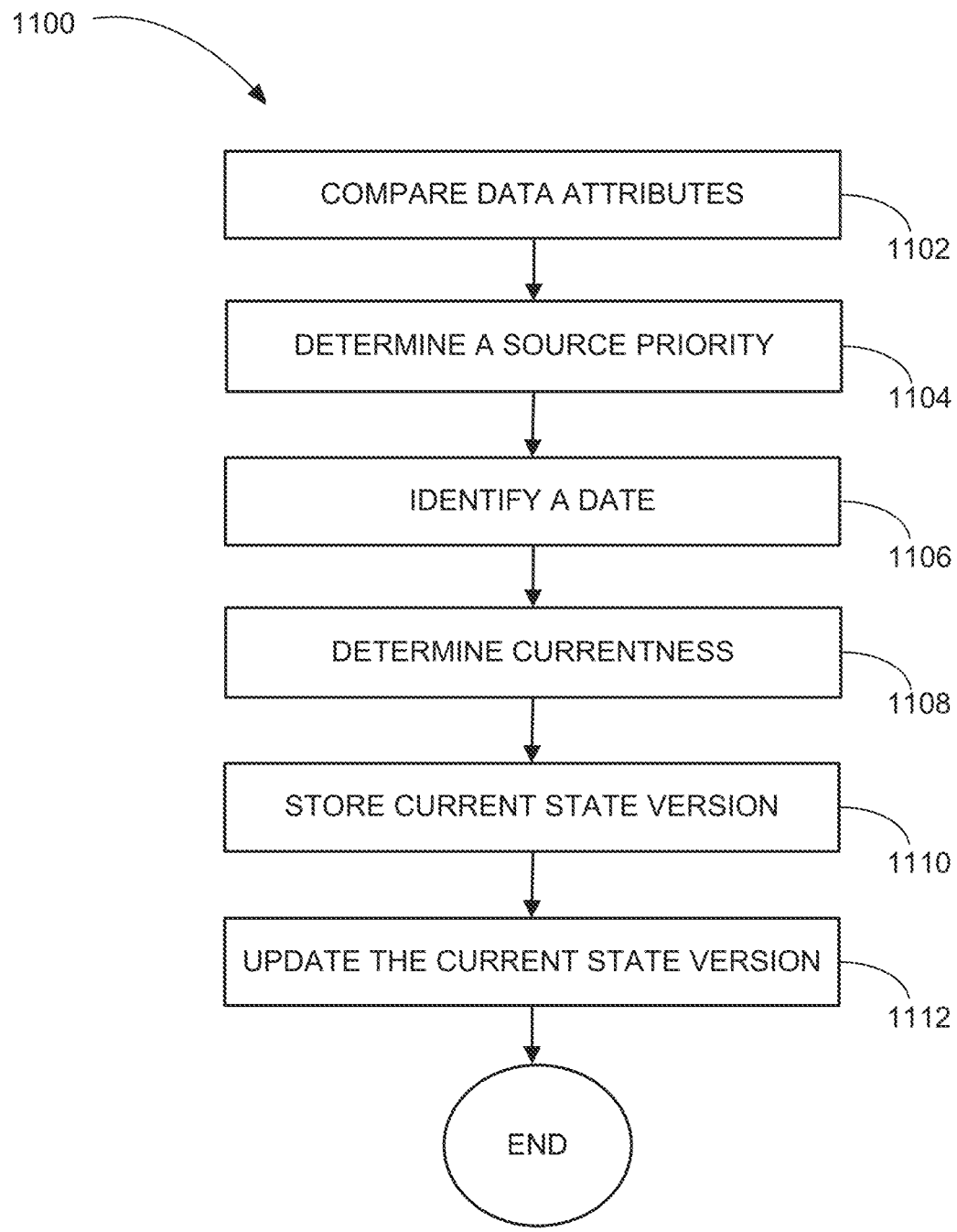
FIGS. 11 and 12 are example process flow illustrating methods for evaluating comparison data, according to example embodiments.

FIG. 11 illustrates an example method 1100 for evaluating comparison data, according to an example embodiment. The operations performed at block 804 (see FIG. 8) may include operations performed by the method 1100. The method 1100 may be performed by the data query device 102, the data manager device 106, the data analysis device 108, the benefit manager device 110, the data supplier device 112, partially by one of the devices 102, 106, 108, 110, 112 and partially by one or more than one of the devices 102, 106, 108, 110, 112, or may be otherwise performed.

Data attributes of comparison data and a master record are respectively compared at block 1102 to determine that there is a difference. The comparison data may originate from a data source.

A relative level of source priority of the data source of the comparison data relative to the data source of a current state version of the master record is determined at block 1104 in accordance with source evaluation criteria.

A date associated with the comparison data may be identified at block 1106. A determination of whether the date associated with the comparison data is more current than the date associated with the current state version of the master record may be made at block 1108.

The current state version of the master record is stored in reference data at block 1110 based on a determination that there is a difference and that the source priority of the data source of the comparison data is equal to or greater than the data source of the current state version of the master record. In some embodiments, the determination is further based on the date associated with the comparison data is more current than the date associated with the current state version of the master record.

Mapped comparison data is used to update the current state version of the master record at block 1112 based on the determination that there is a difference and that the source significance of the data source of the comparison data is equal to or greater than the data source of the current state version of the master record to create an updated state version of the master record, the mapped comparison data being based on the comparison data. In some embodiments, the determination is further based on the date associated with the comparison data is more current than the date associated with the current state version of the master record.

In some embodiments, a determination is made that that comparison data is previously stored in the reference data 124 as mapped comparison data. The mapped comparison data may be used to update the current state version of the master record is then further based on a determination that the comparison data is already stored in the reference data.

In some embodiments, the comparison data is formatted in accordance with a standardized format to create formatted comparison data, the comparison data is split in accordance with a standardized field splits format, the formatted comparison data is mapped into data fields based on the standardized field splits format to create the mapped comparison data.

In some embodiments, a source data provider (e.g., the benefit manager device 110 and/or the data supplier device 112) associated with the comparison data is identified. A determination of whether a source data import from the source data provider has previously been performed is made. When a determination is made that the source data import has previously been performed, the standardized format and the standardized field splits format associated with the source data provider are selected.

Figure 12:
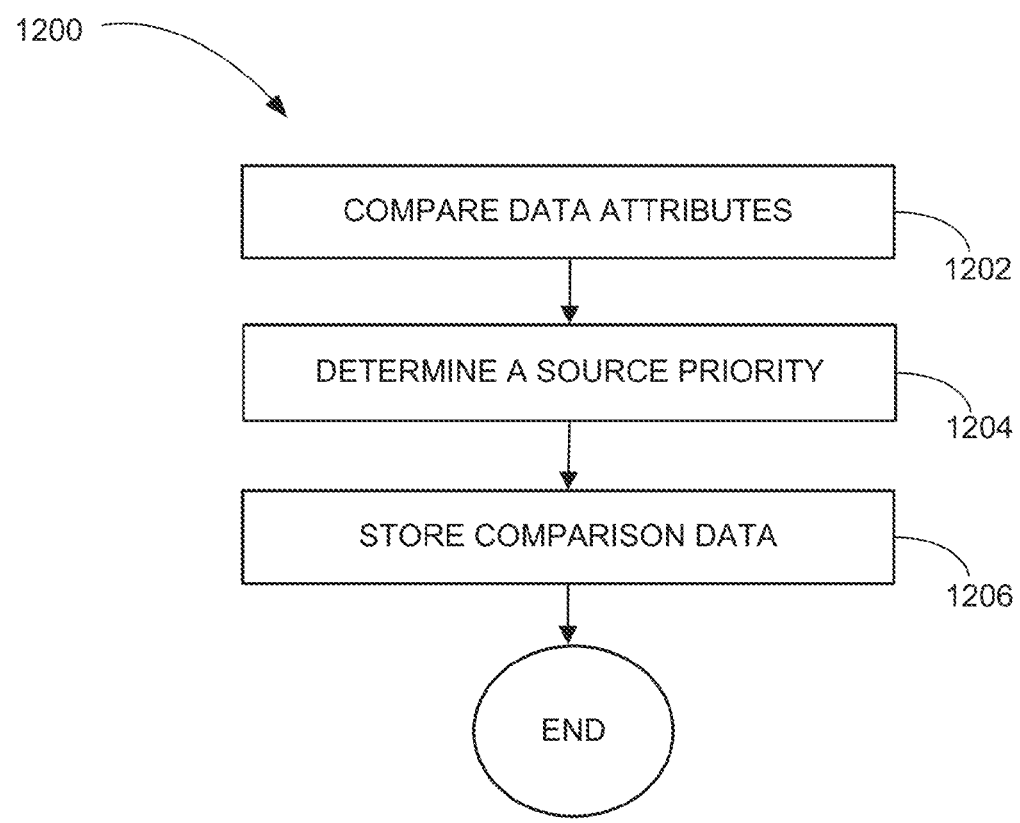

FIG. 12 illustrates an example method 1200 for evaluating comparison data, according to an example embodiment. The operations performed at block 804 (see FIG. 8) may include operations performed by the method 1200. The method 1200 may be performed by the data query device 102, the data manager device 106, the data analysis device 108, the benefit manager device 110, the data supplier device 112, partially by one of the devices 102, 106, 108, 110, 122 and partially by one or more than one of the devices 102, 106, 108, 110, 122, or may be otherwise performed.

At block 1202, data attributes of comparison data and data attributes of a master record are respectively compared to determine that there is a difference. A relative level of source priority of the data source of the comparison data is determined at block 1204 relative to the data source of a current state version in accordance with source evaluation criteria. The comparison data is stored in reference data 124 at block 1206 based on a determination that there is a difference and that the source significance of the data source of the comparison data is less than the data source of the current state version of the master record.

Figure 13:
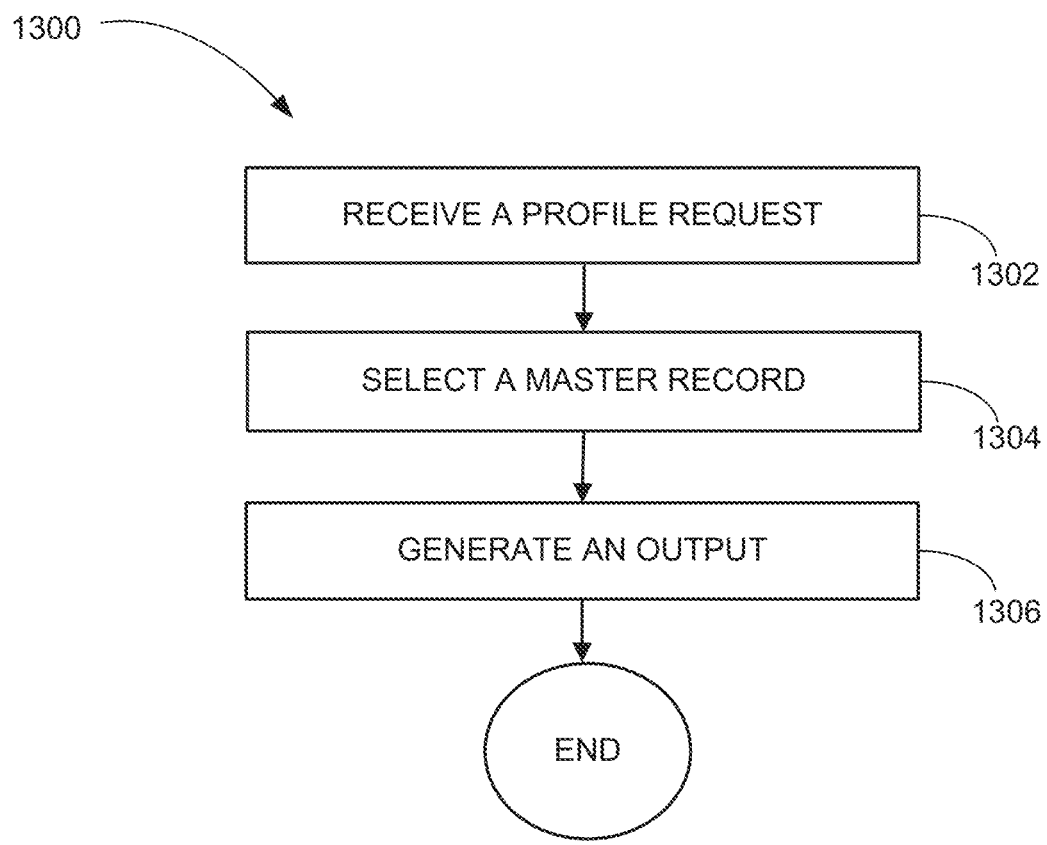
FIG. 13 is an example process flow illustrating a method for output generation, according to an example embodiment.

FIG. 13 illustrates an example method 1300 for output generation, according to an example embodiment. The operations performed at block 806 (see FIG. 8) may include operations performed by the method 1300. The method 1300 may be performed by the data query device 102, the data manager device 106, the data analysis device 108, the benefit manager device 110, the data supplier device 112, partially by one of the devices 102, 106, 108, 110, 122 and partially by one or more than one of the devices 102, 106, 108, 110, 122, or may be otherwise performed.

A profile request for a prescriber, a pharmacy, or a patient is received at block 1302. At block 1304, an updated state version of the master record is selected based on receipt of the profile request. An output such as a hardcopy or user interface or display including at least a portion of the updated state version of the master record is generated at block 1306.

FIGS. 14-47 are example displays, according to example embodiments. The displays include example user interfaces and/or example data that may be generated by the transformation subsystem 202 and ultimately presented to an operator of a device 102, 106, 108, 110, 112. However, other types of displays and modifications to the displays may additionally or alternatively be presented.

In some embodiments, the displays may be presented universally to all operators. In some embodiments, only certain functionality and/or access to certain data may be enabled to certain operators.

Figure 14:
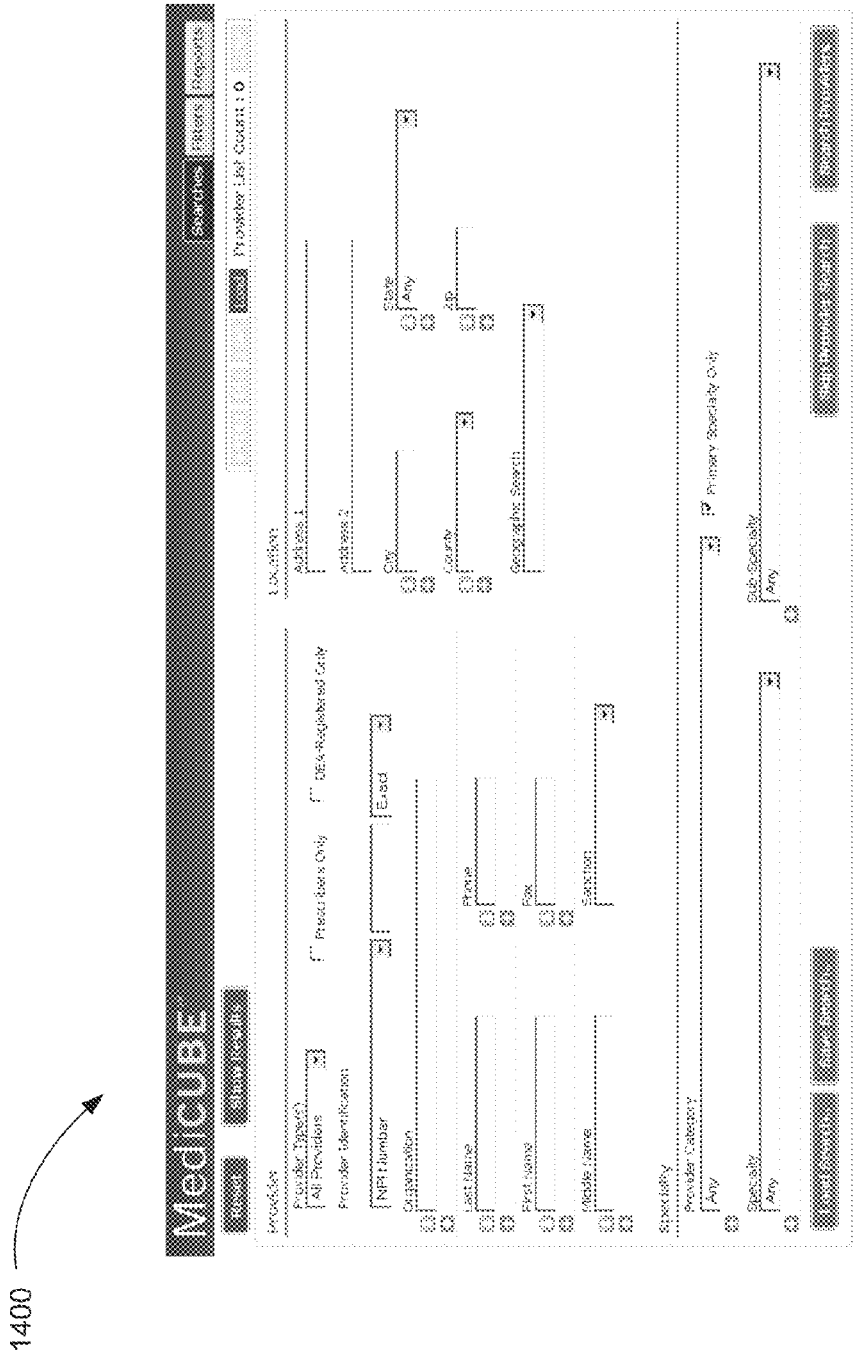

FIG. 14 is an example display 1400 reflects an example provider search display for searching within the master data 122. In the display 1400, a search may be conducted using provider information. Information may be entered into any one or more of the available entry fields, and/or selected via a drop down menu. Examples of information which may be entered may include, but is not limited to, organization name, provider name, phone number address, NPI number, provider category, specialty, and subspecialty. Further, the search may be constrained based on geographical constraints, such as street address, zip codes, city, county, state, metropolitan statistical areas, hospital service areas, hospital referral regions, or any other suitable geographic designation. In some embodiments, a custom geographic region of interest may be defined. Such an area may be defined as a geometric shaped (e.g., a circular or rectangular) zone around an operator-selected geographic definition with the operator-selected width/length and radius respectively.

By way of example, a provider searches may be based upon, and/or may include, NPI number search criteria. The NPI number search criteria may be selected to identify exact matches, partial matches, and/or matches that begin with the operator provided search string. Similarly, as shown, geographic constraints may also be utilized. For example, a geographic search may include one or more than one of a city, state, country, zip code or other geographic designation. Further, the geographic search criteria may be focused to provide a circular, rectangular, metropolitan area, region or division around the geographic designation. The geographic search focus criteria may allow the operator to apply a radius or dimensional aspect to the geographic search. For example, and as shown in a prior display, a provider search may be established for individual providers, who are DEA registered, are physicians, MD and DD, practicing in the area of family medicine, in the Saint Louis, Mo. geographic region, in a 10 mile by 10 mile rectangular bounded region around the zip code 63108.

For example, by selecting provider type drop down menu the operator can select and specific a type of provider (e.g., individual, organization, or pharmacy) to focus the search. Otherwise, the operator can select all providers (e.g., as is the default provider specification). The operator can also specify whether to only search for prescribers or DEA-register prescribers only.

A variety of identifiers may be used for various identifier oriented searches (e.g., an exact search, a starts with search, or a partial search. For example, the provider identifiers may include all identifiers, a NPI number, a specialty pharmacy identifier, an alternate identifier, a DEA number, a PBM identifier, a Medicaid identifier, a Medicare ID (unspecified), a Medicare NSC, a Medicare OIG exclusion, a Medicare Oscar/Certification, a Medicare PIN, a Medicare UPIN, PECOS, and a state or other license. Other identifiers may also be searched.

A sanction may be specified for search criteria including, by way of example, CMS expiration, DEA expiration, license sanction, or any other sanction or exclusion.

In some embodiments, the provided search information may be misspelled or partial and, based on the operations performed by the transformation subsystem 202, the relevant results may be generated and provided on a display.

Providers identified by the search may be added to the NPI list, for example, using a drop down menu in the upper left hand corner of the provider search results display 1400. Further, the NPI list may be edited, e.g., from the provider search display, e.g., via a drop down menu in the upper right hand corner of the provider search display.

The show results button enables the operator to switch between search results and a search screen that enables further modification of search parameters. The load search and save search buttons enable loading and savings of search filters. The searchers, filters, and report buttons enable navigation between different types of displays generated by the transformation subsystem 202. The skip provider search button enables a universal-type search from any available search entry field (e.g., as may be available through the transformation subsystem 202). The search provider button enables the search to be run.

The add all, edit, save, load, and clear buttons in conjunction with the provider list count identifier may act as a provider list management console. The reset button may clear all search parameters from a previous searching session and/or saved NPI provider lists.

Figure 15:
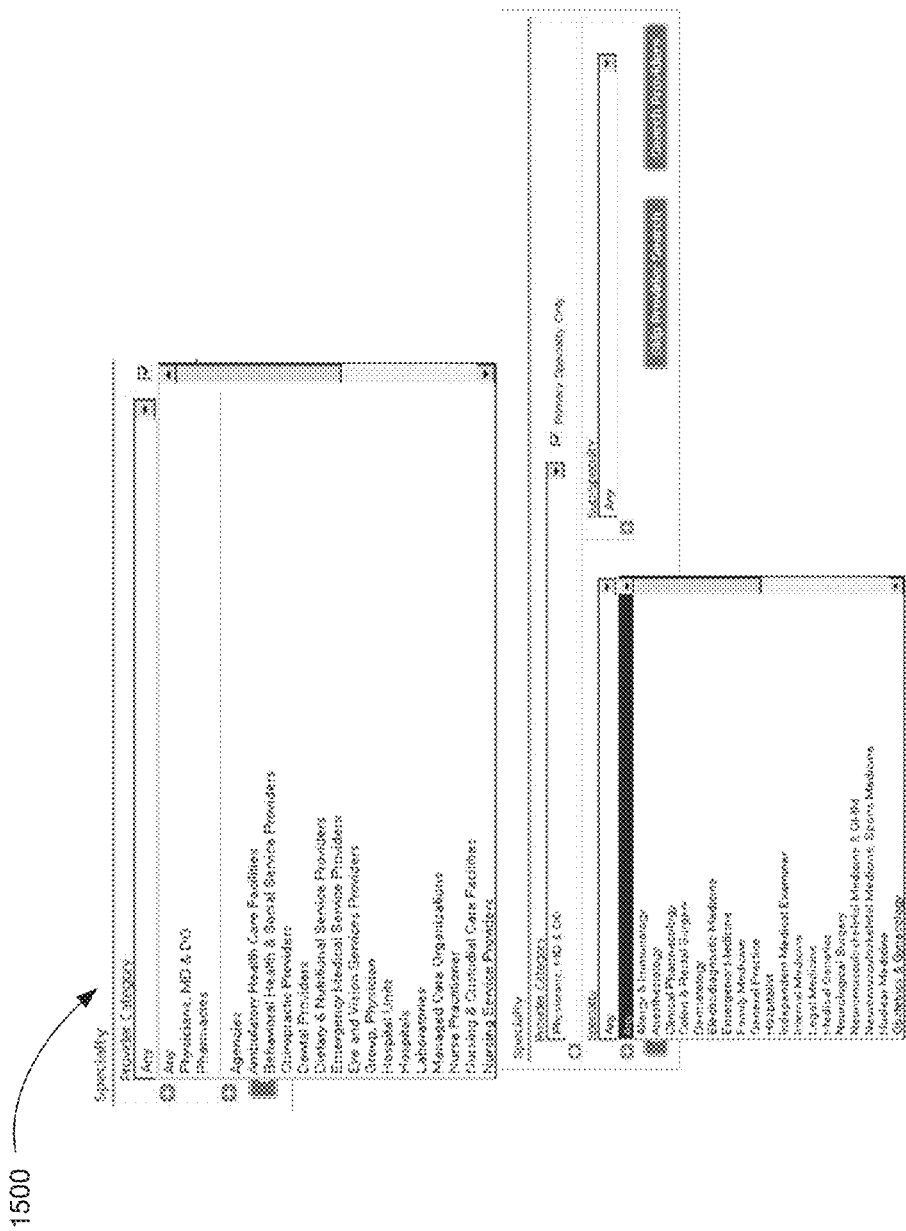

FIG. 15 is an example display 1500 where a provider search may also be focused based on a provider category. The provider category may allow an operator to quickly find a selected type of provider (e.g., to focus or filter the search based upon, at least in part, the selected provider type). In the example display 1500, the transformation subsystem 202 may utilize provider categories that may improve the ease of operator understanding. In other embodiments, standard CMS provider taxonomy codes, or other provider categorization systems, may be utilized.

Figure 16:
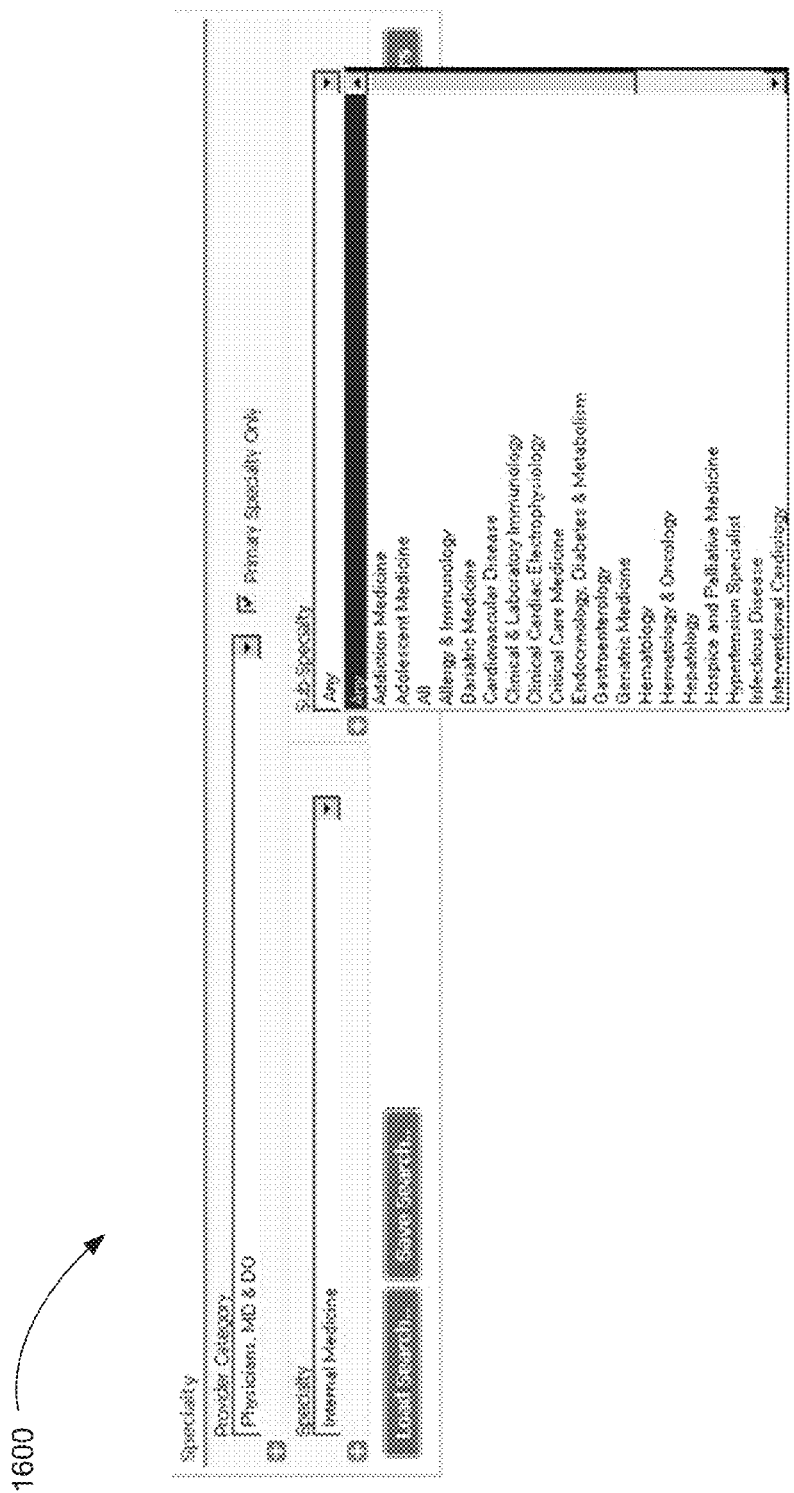

FIG. 16 is an example display 1600 where provider specialty and sub-specialty designations may be provided which may facilitate improved search, e.g., through the use of understandable and/or common specialty and sub-specialty designations. In other implementations, standard CMS taxonomies, or other categorization systems, may be utilized for focusing a provider search based upon, at least in part, a selected provider specialty and/or sub-specialty.

Figure 17:

FIG. 17 is an example display 1700 where an example provider search results are shown. In the example provider search results display 1100, the providers satisfying the search criteria are shown in a mail-label display format, although other display formats may be utilized. As shown, each search result may identify the provider, the provider's specialty, the provider's address and telephone number and the provider's NPI number. Additionally, in an example embodiment, other information regarding the identified providers may be included. For example, the search results may be coded (e.g., by red highlighting or other suitable indicator) to indicate providers with sanctions and/or an expired license. Additional information regarding a specific provider may be obtained by selecting the desired provider from the display 1700.

A provider may be selected to provider count list by selecting the plus button associated with the provider. The provider count list reflects the total count of providers that have been selected and will be processed for reports. The clear button clears the selected providers from being processed for the report, while the edit button enables editing of the provider list. The save button enables the provider list to be saved (e.g., to identify providers for a narrow network), while the load button enables a previously saved lists of providers to be loaded.

While the display 1700 of the provider search results is shown in a label-type format, other types of data display formats may be used.

Figure 18:
Figure 19:
Figure 20:
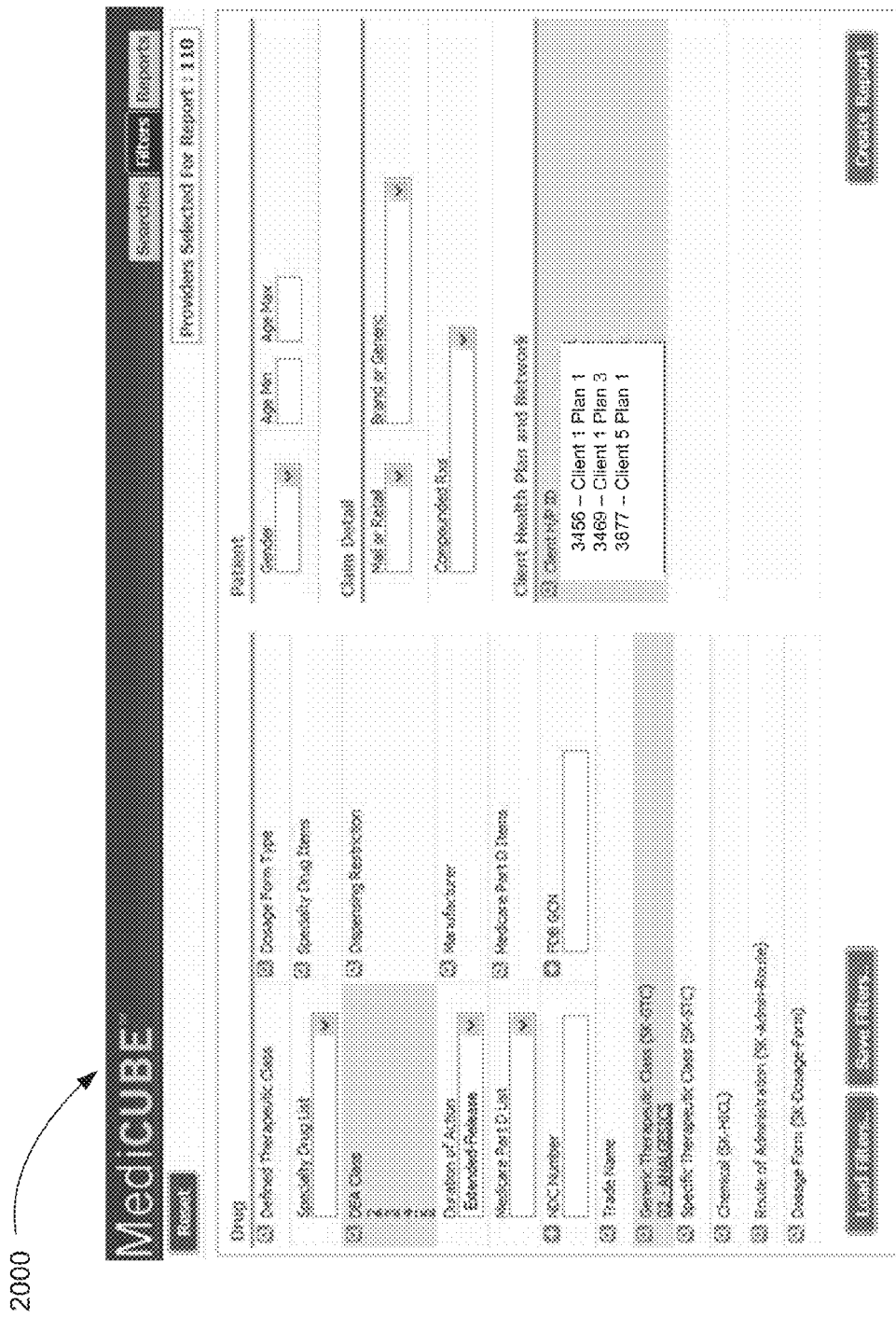

FIG. 18 is an example display 1800 in which additional information is provided on a provider in the form of a provider profile menu. The display 1800 may be generated by hovering of a portion of the display associated with a particular provider, by a single click on a displayed record, or otherwise. In some embodiments, a recorder with greater detail may be shown by selecting an available link indicated in the display 1800 as a "see full provider profile" link. In addition, the display 1800 reflects a provider having sanctions and/or an expired license by having highlighting on a portion of the display associated with the provider.

The back to search button enable switching between search and results displays. The display rows buttons switches between title and row display modes.

FIGS. 19-22 are example displays 1900-2200 for conducting further search inquiries. The display 1900 of FIG. 19 enables searching by drug criteria, patient criteria, or carrier search criteria. A single search criterion or multiple criteria may be used to search through the displays 1900-2200. For example, multiple search criteria may be defined through display 1900 for a single search.

For example, having saved one or more providers to the NPI list, an operator may further conduct search queries using the saved NPI list of providers, for example to search by drug and/or patient, and/or claim, and/or plan data. For example, from within any of the preceding displays the "drugs and patients" tab may be selected from the top right hand corner of the preceding displays, resulting in claims/drugs/patients search display 1900 shown in FIG. 19. As shown, the claims/drugs/patients search display 1900 may allow additional search criteria to be provided by the operator relating to claims information, drug information, and/or patient information. The additional search criteria may be applied to information cross-referencing one or more than one of the providers included in the saved NPI list of providers.

By selecting the defined therapeutic class drop down menu, a selection of one or more than one baskets of drug classes may be made for a claim pull. In some embodiments, the enablement of the functionality may only be to licensees of providers of such information.

The dosage form type allows selection of one or more than one general dosage types (e.g., capsules and tablets) for a claim pull. The specialty drug list allows selection by a sourcing provider of specialty drugs such as ACCREDO or CURASCRIPT. Specialty drug items selections allows specification of specialty drug items from the specialty drug list.

For example, in addition to date parameters, one or more drug search criteria may be entered by the operator (e.g., via direct text entry, drop down menu, checkbox, etc.). For example, as shown in an upper portion of display 2000 of FIG. 20, a drug search criteria of DEA class drugs may be selected from the DEA drug class drop down menu. Further, as shown in a lower portion of display 2000 of FIG. 20, claim criteria may additionally and/or alternatively be entered. For example, the claim search criteria for retail pharmacies may be selected. Selecting Run Report from within the claims/drugs/patients search display may create the query. Duration of action of the prescription drug can be specified by immediate-release, extended-release, or other. The manufacturer of the prescription drugs may be specified by ID or name to limit pulling claims for those manufacturers' medications only. Medicare Part D list allows the operator to select or disallow only Medicare Park D-covered drugs. Medicare Part D items allow the operator to select the items from the Medicare Part D-covered list. When selected, only the selected Medicare Park D items on that list are pulled. NDC number allows the operator to input one or more than one NDCs for pulling claims.

Generic Therapeutic Class (SK-GTC) allows the operator to select from one or more than one 2-digit SK-GTC codes or by descriptions. Specific therapeutic class (SK-STC) allows the operator to select from one or more than one 4 character SK-STC codes or by descriptions. Chemical (SK-HICL) allows the operator to select from one or more than one 5-digit SIK-HICL codes or by description. Route of administration allows the operator to select from one or more than one rout of administration (e.g., injection) by code or description. The dosage form allows an operator to select from one or more than one dosage forms by code or description.

Claim detail may also be specified including mail or retail, brand or generic, and compounded prescription drugs. Patient information may be specified as well include age and minimum and maximum age.

The load filters button loads previously saved search parameters, while the save filters button saves selected search parameters for future use. The create button creates the report.

Multiple filters may be combinable to specific the claims of interest. As shown, all claims for controlled extended-release analgesics will be pulled and for the specific carrier IDs.

Figure 21:
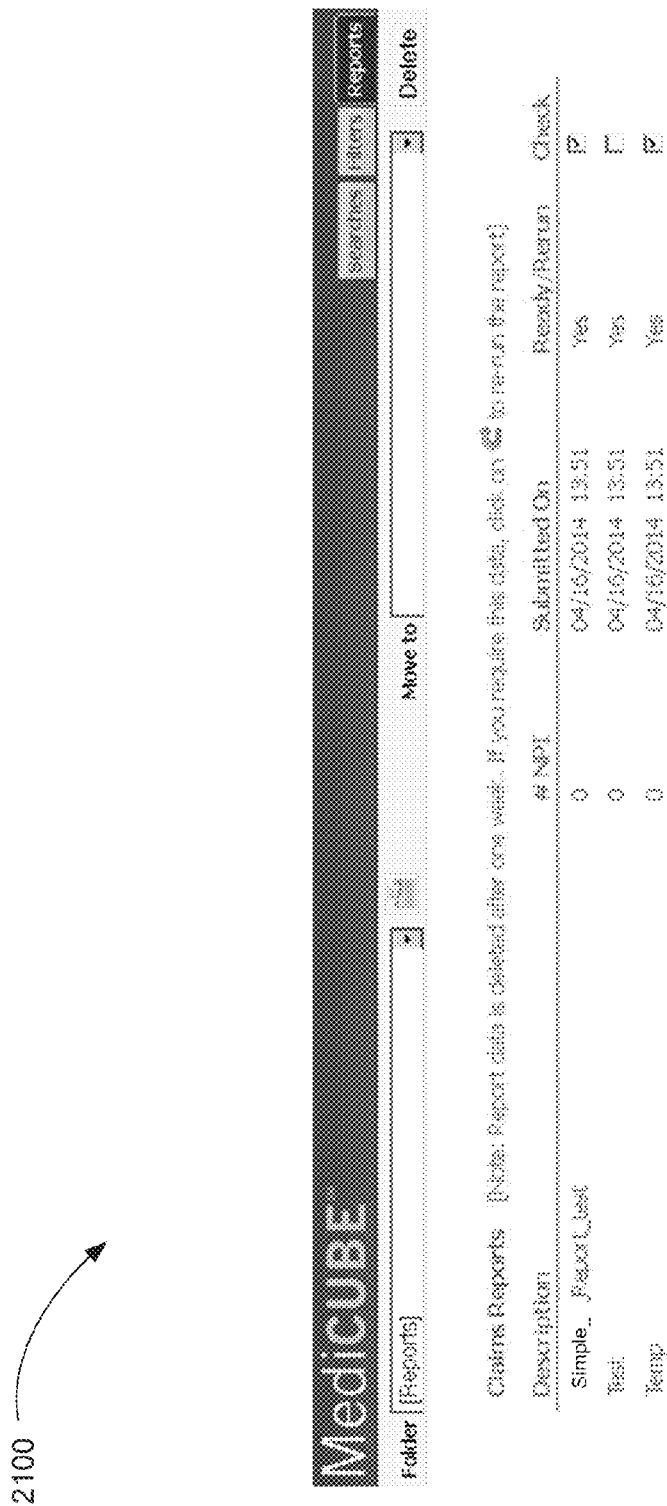
Figure 22:
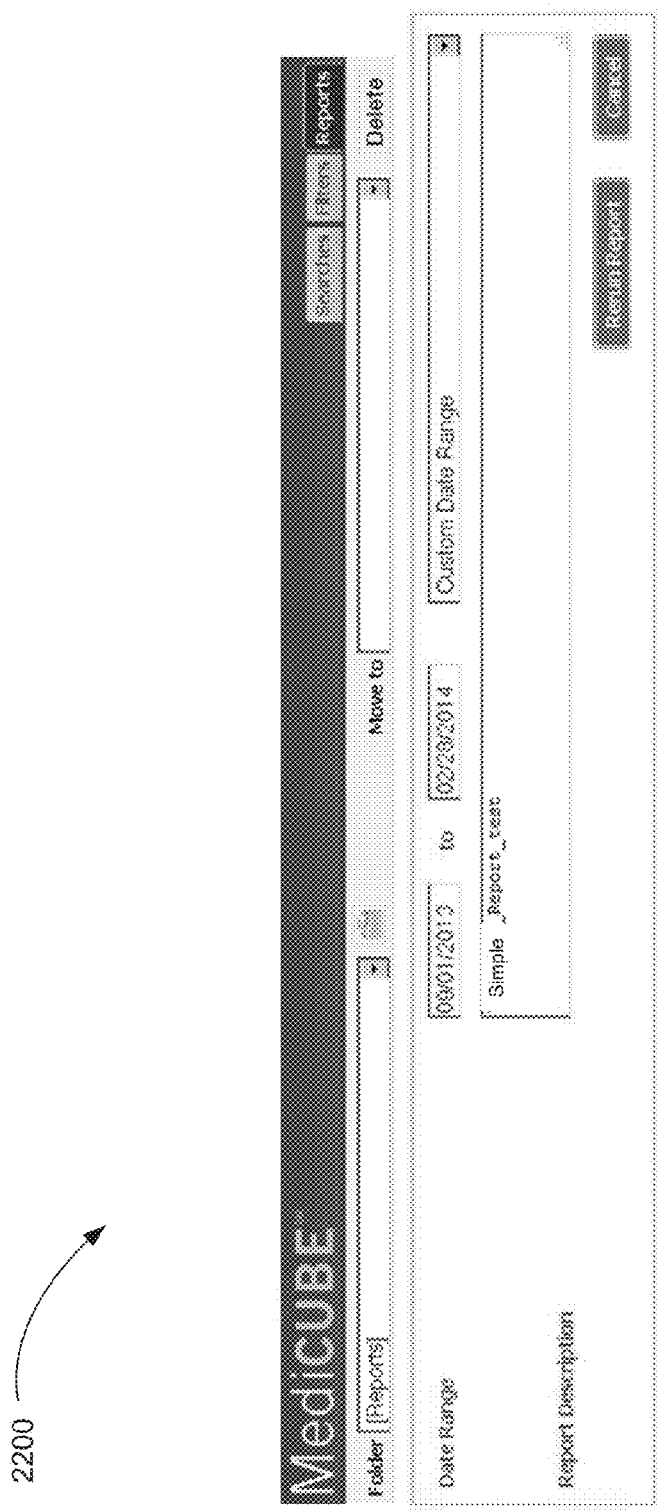
Figure 23:
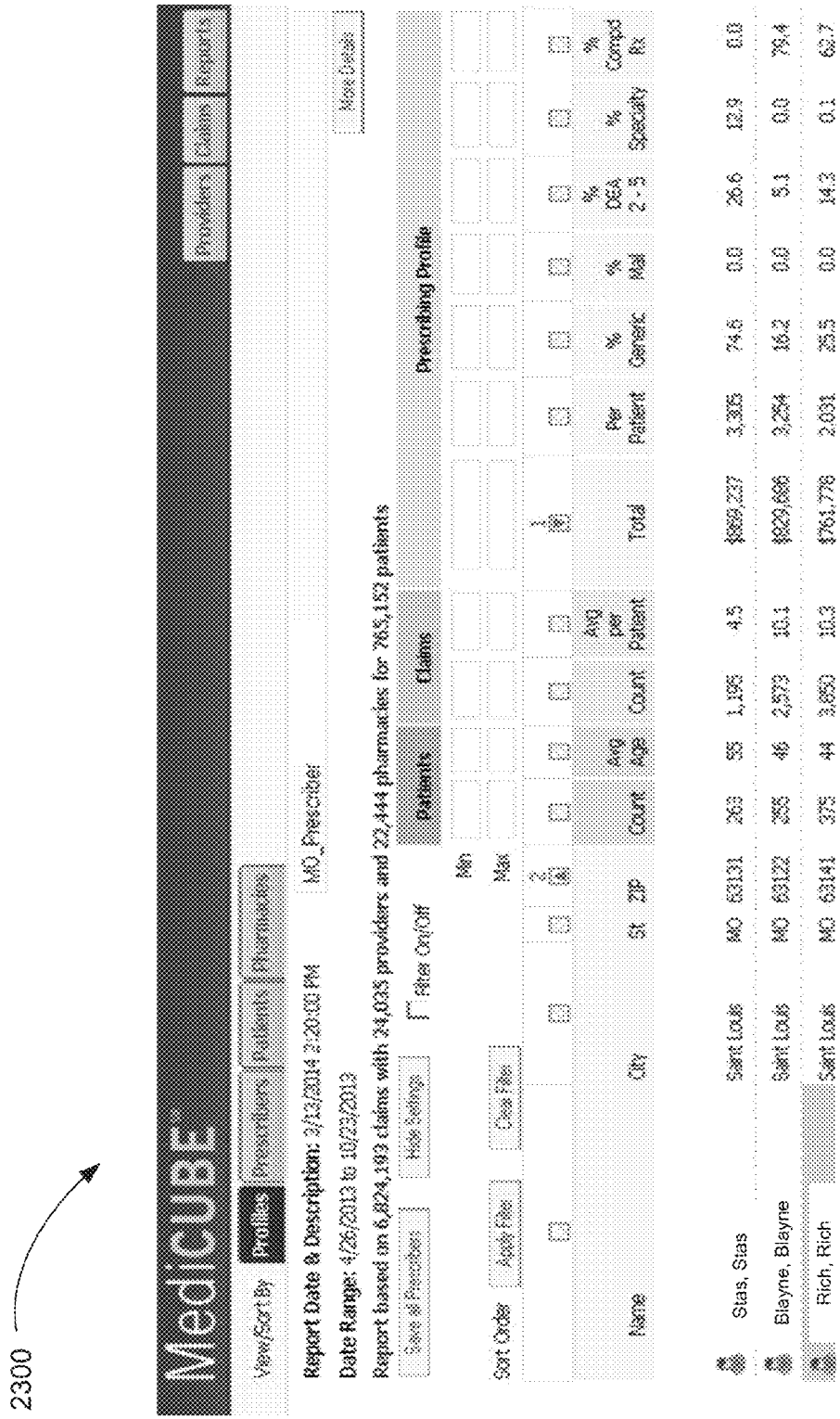

FIG. 21 is an example display 2300 of a claims report that includes a list of available reports. The available reports may include, for example, reports for which a search query has been built and executed. Selecting a desired report form within the claims report display 2100 may cause the search query associated with the report name to be executed over the master data 122. FIG. 22 is an example display 2200 showing selection of a report for rerunning FIG. 23 is an example display 2300 showing a report review. The profiles, prescribers, patients, and pharmacies tabs may be used to toggle between the respective views.

Figure 24:
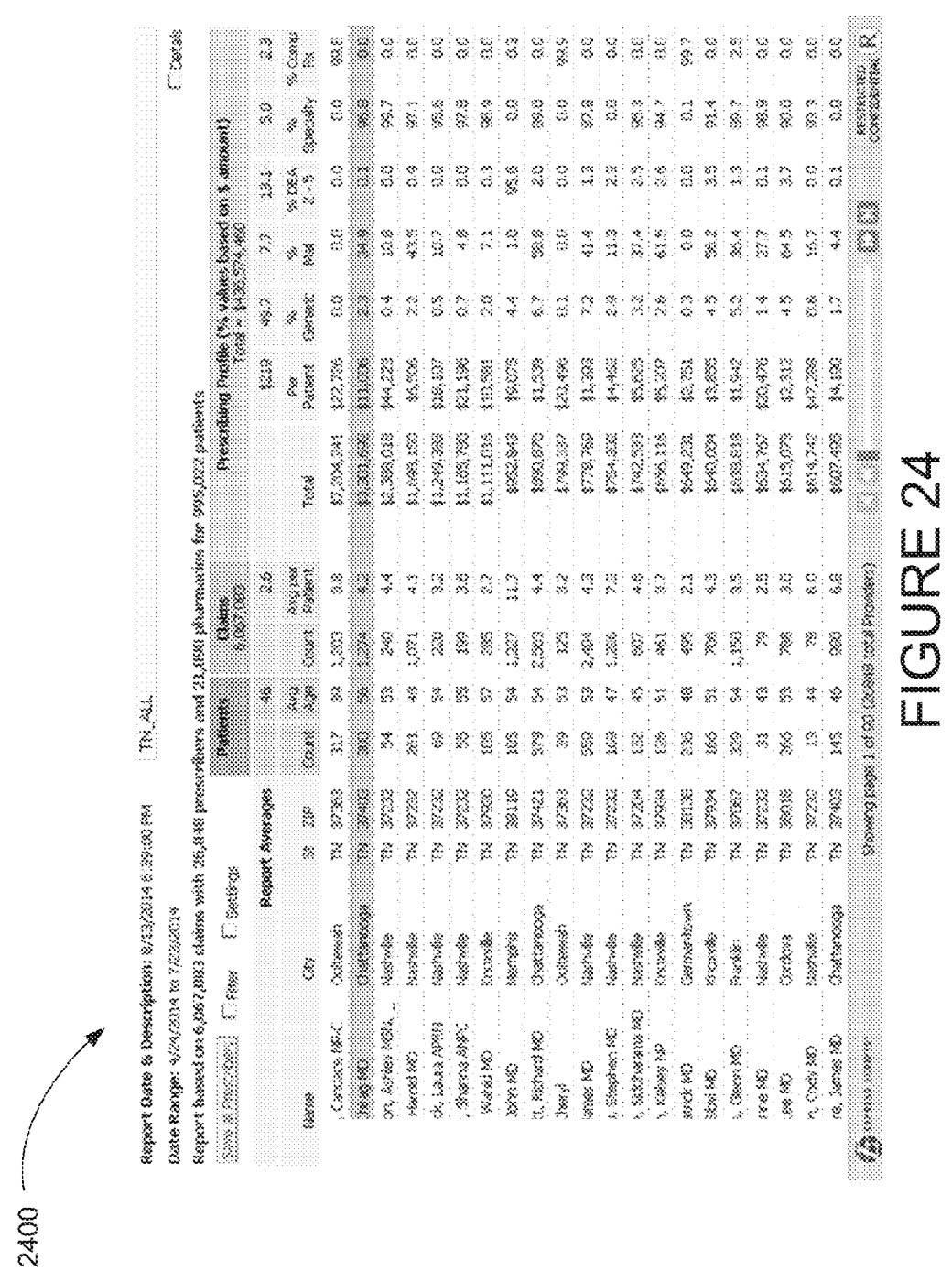
Figure 25:
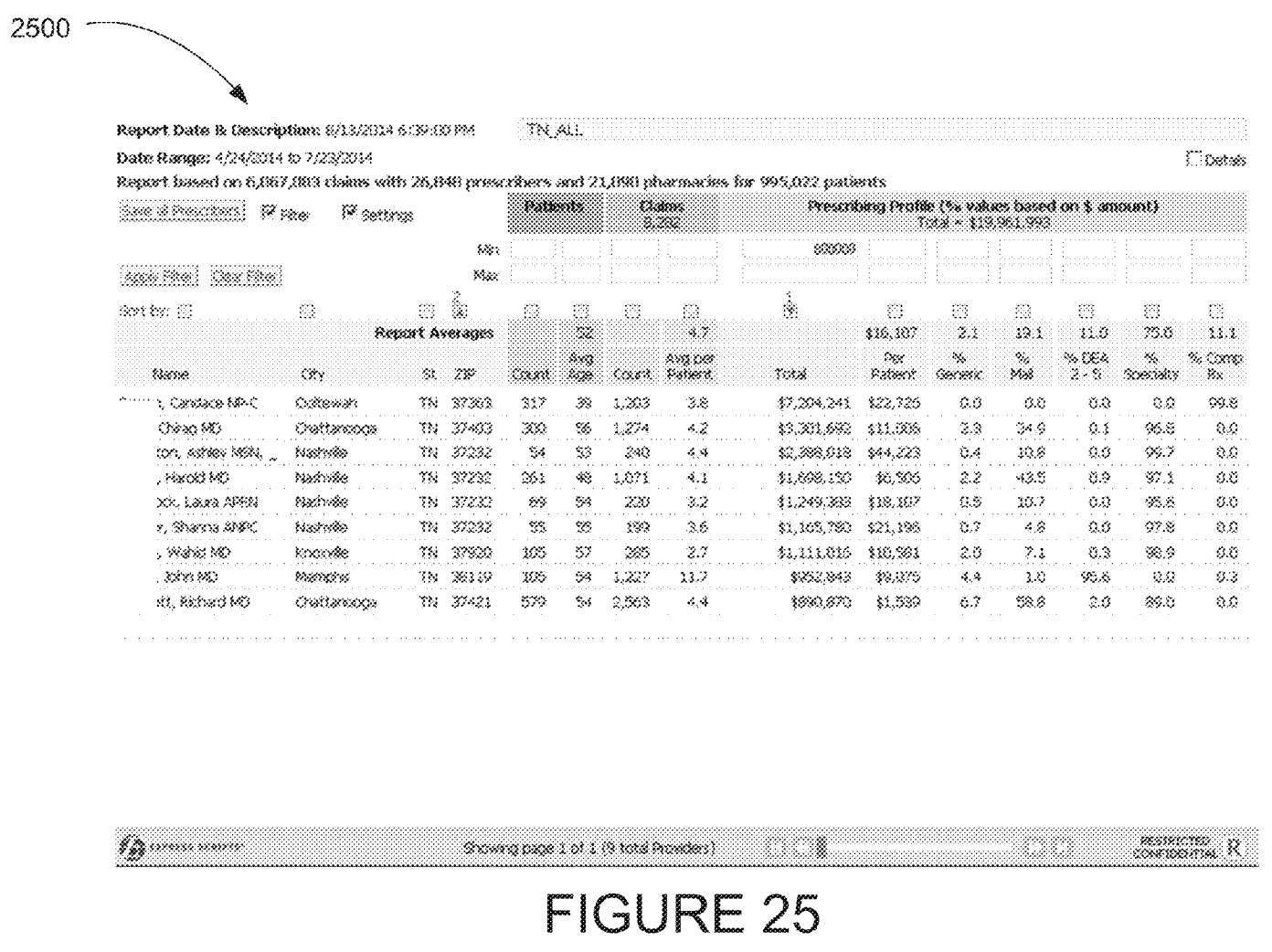

FIGS. 24 and 25 are example displays 2400, 2500 showing report screens for prescribers without and with filtering and sorting functionality. Filtering may enable definition of a range of data to be displayed for each report. Sorting may enable a sort order to be defined.

The display 2400 that provides prescriber information including name, city, state, ZIP along with a number of patients, average patient age, claims count, average number of claims per patient, and a breakdown of prescribing behavior by total dollar spend, dollars spent per patient, percentage of generic, percentage sent through mail, percentage DEA/controlled, percentage specialty, and percentage of compound drugs.

The save all button enables savings all of the providers identified in the search results to the provider count list. By saving the search results to the list, the operator can edit the list, save the list, run other searches independently of the list and add additional search results to the list. Various search filters can be further applied against the list.

Selection of the settings button enables on the display 2400 enables certain filtering options to appear as shown on the display 2500. Once the filtering options are specified, they may be applied by selecting the filter button. As shown in the display 2500, the information generated in the display 2400 may be filtered setting a minimum and/or maximum range for a number of the foregoing numbers. By so entering these values, the number of entries included in the display 2500 relative to the display 2400 may be reduced.

In addition, the display 2500 provides for modifying the order of the display results. By enabling a sort by box, the order of the results can be modified in either an ascending or descending manner and/or in accordance with a sorting hierarchy. In addition, multiple sorting priorities in the form of a sort order can be defined. For example, a primary, a secondary, and a tertiary sort order can be defined.

Figure 26:
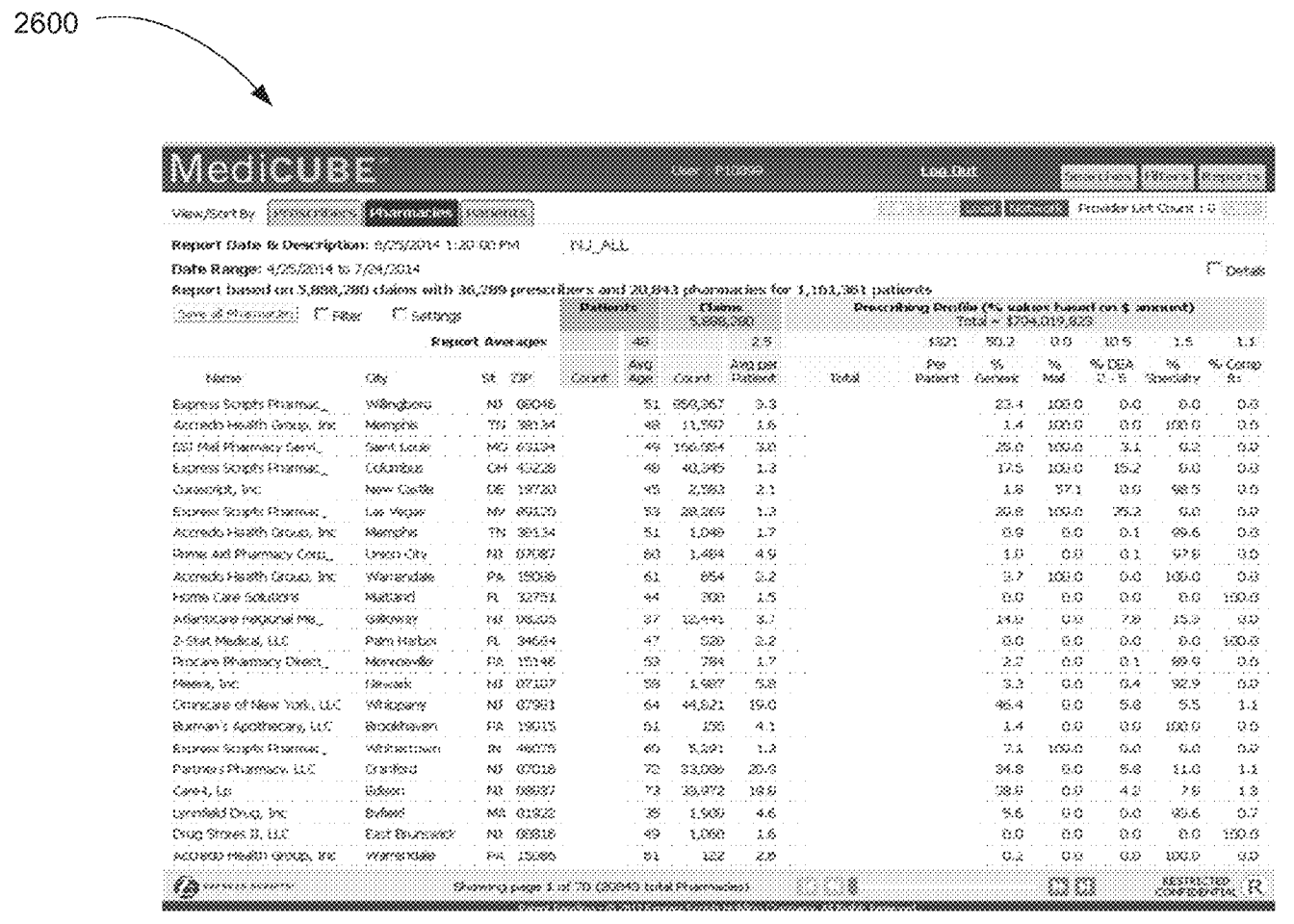
Figure 27:
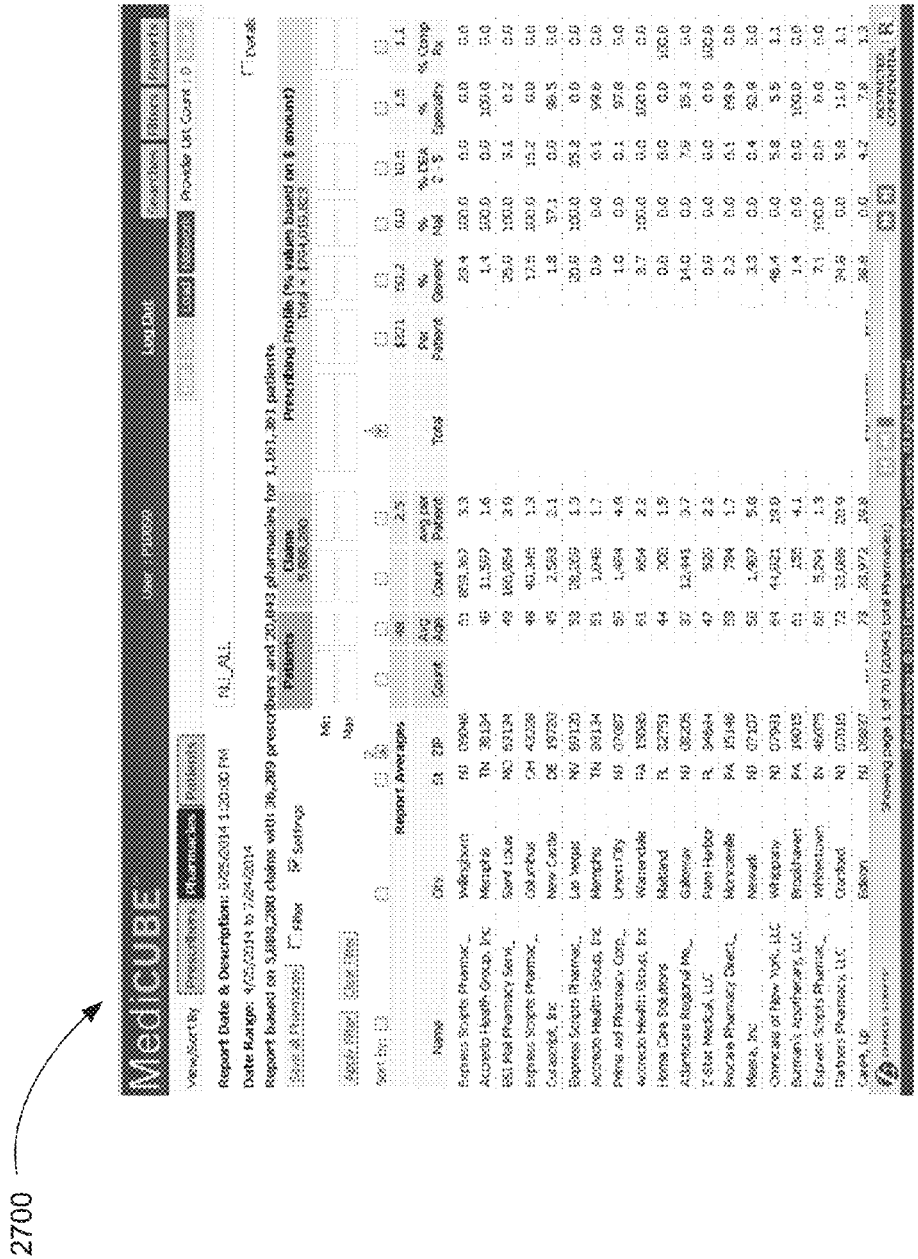

FIGS. 26 and 27 are example displays 2600, 2700 showing report screens for pharmacies without and with filtering and sorting functionality. Filtering may enable definition of a range of data to be displayed for each report. Sorting may enable a sort order to be defined. The functionality of the sorting and filtering may be used as described above with respect to displays 2400, 2500.

The display 2600 that provides pharmacy information including name, city, state, ZIP, along with a number of patients, average patient age, claim count, average claims per patient, and a breakdown of prescribing behavior by total dollar spend, dollars spent per patient, percentage of generic, percentage sent through mail, percentage DEA/controlled, percentage specialty, and percentage of compound drugs.

The save all button enables savings all of the providers identified in the search results to the provider count list. By saving the search results to the list, the operator can edit the list, save the list, run other searches independently of the list and add additional search results to the list. Various search filters can be further applied against the list.

Figure 28:
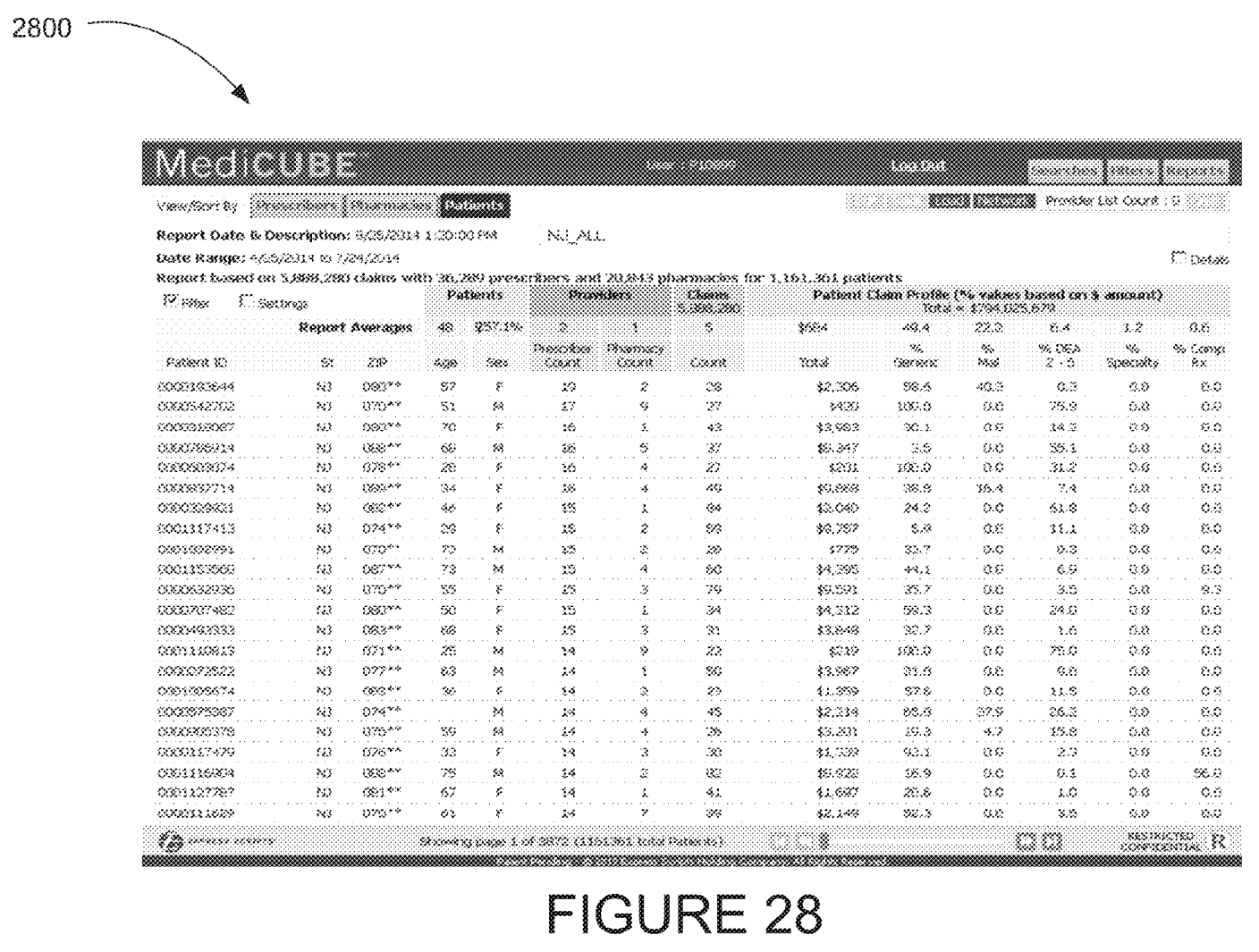
Figure 29:
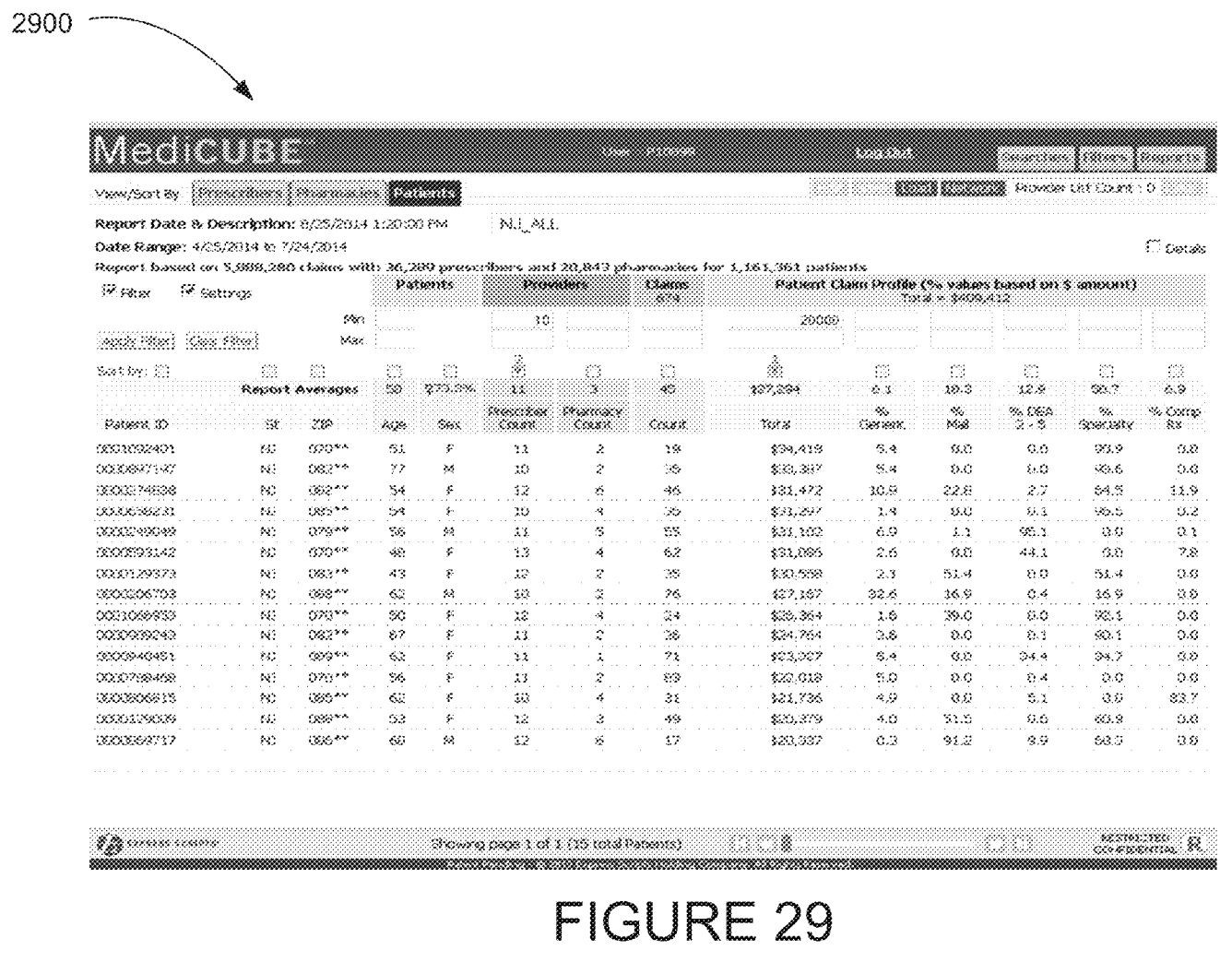

FIGS. 28 and 29 are example displays 2800, 2900 showing report screens for patients without and with filtering and sorting functionality. Filtering may enable definition of a range of data to be displayed for each report. Sorting may enable a sort order to be defined. The functionality of the sorting and filtering may be used as described above with respect to displays 2400, 2500.

The display 2800 provides patient information including a patient identifier (e.g., an anonymized patient ID, a state, a ZIP code (e.g., a de-identified ZIP code), average patient age, patient sex, a prescriber count, a pharmacy count, a claims count, and a breakdown of patient behavior by total dollar spent, percentage generic, percentage sent through mail, percentage DEA/controlled, percentage specialty, and percentage of compound drugs.

The save all button enables savings all of the providers identified in the search results to the provider count list. By saving the search results to the list, the operator can edit the list, save the list, run other searches independently of the list and add additional search results to the list. Various search filters can be further applied against the list.

Figure 30:
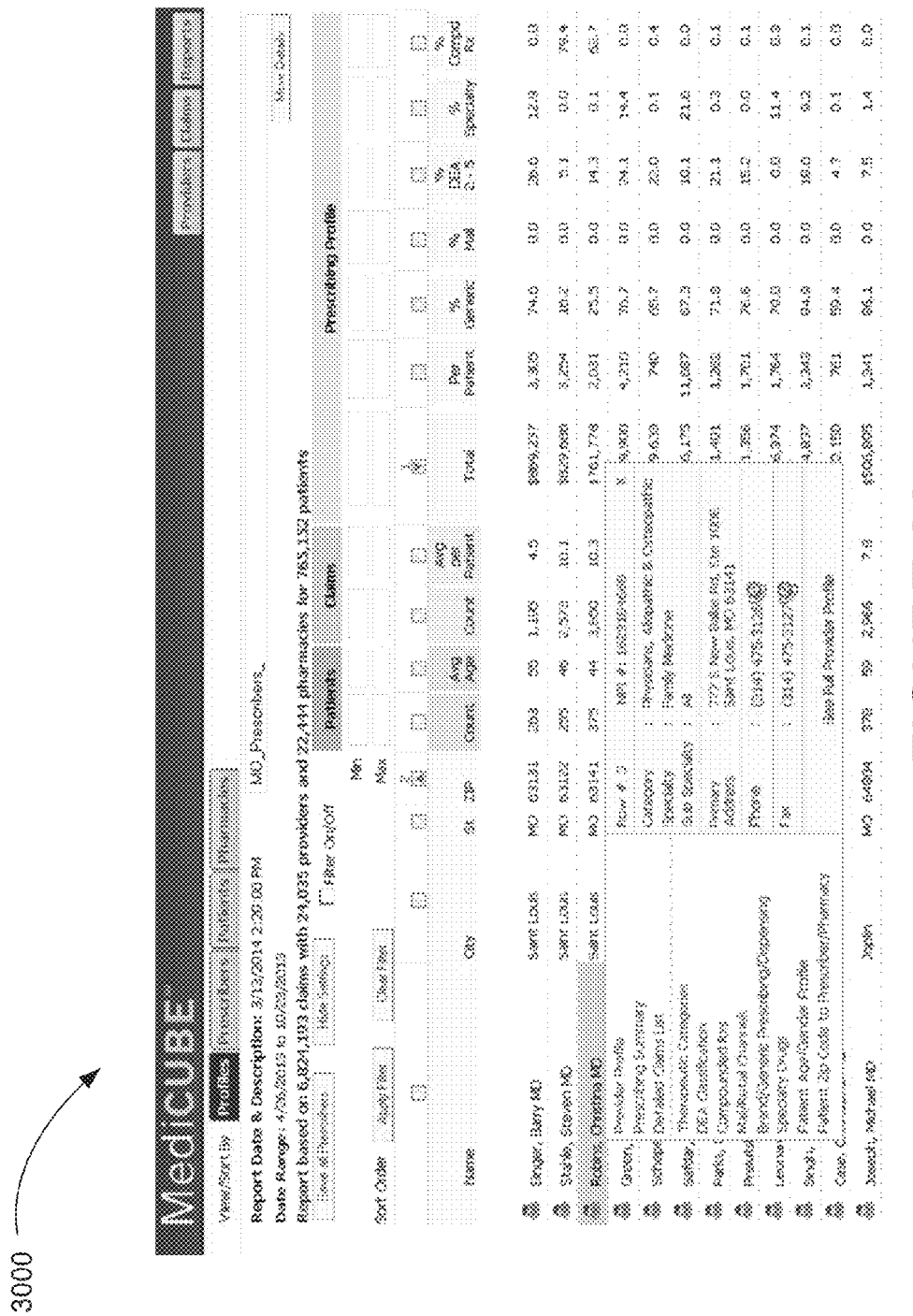

FIG. 30 is an example display 3000 that shows a prescriber report with a utilization view. Selection of a provider name enables access to the provider profile menu as shown.

Figure 31:
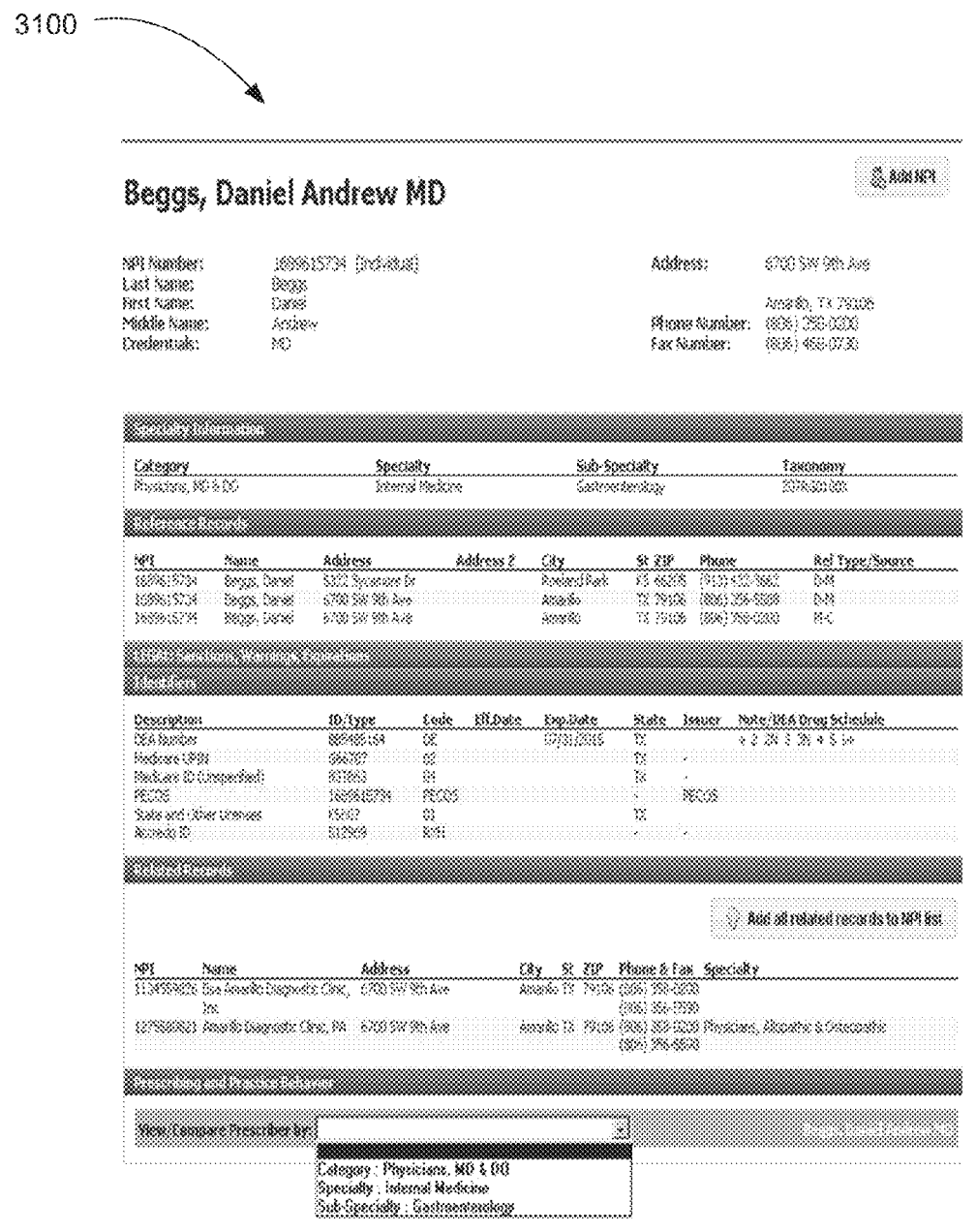

FIG. 31 is an example display 3100 of a detailed provider profile. For example, in response to selecting a specific provider, the detailed provider profile display 3100 may be generated. In the detailed provider view display 3100, detailed information regarding the selected provider may be displayed. For example, the display 3100 may include the provider's name, address, telephone number, credentials, NPI number, various other identifiers, specialty information including category, specialty, subspecialty, and taxonomy codes, and reference records including prior names, addresses, and telephone numbers that have been associated with the provider. Further, the display 3100 may include information regarding sanctions, warnings, and expirations. For example, an indication may be provided that the provider's DEA registration has expired. The existence and status of other licenses and registrations may be included. Other cross-referenced records may also be included in the display 3100. For example, an organizational NPI number with which the provider has been associated may be included in the display, as well as information regarding the organization.

The prescribing and practice behavior enables comparison of the provider against other providers grouped by category, specialty, or subspecialty.

Figure 32:
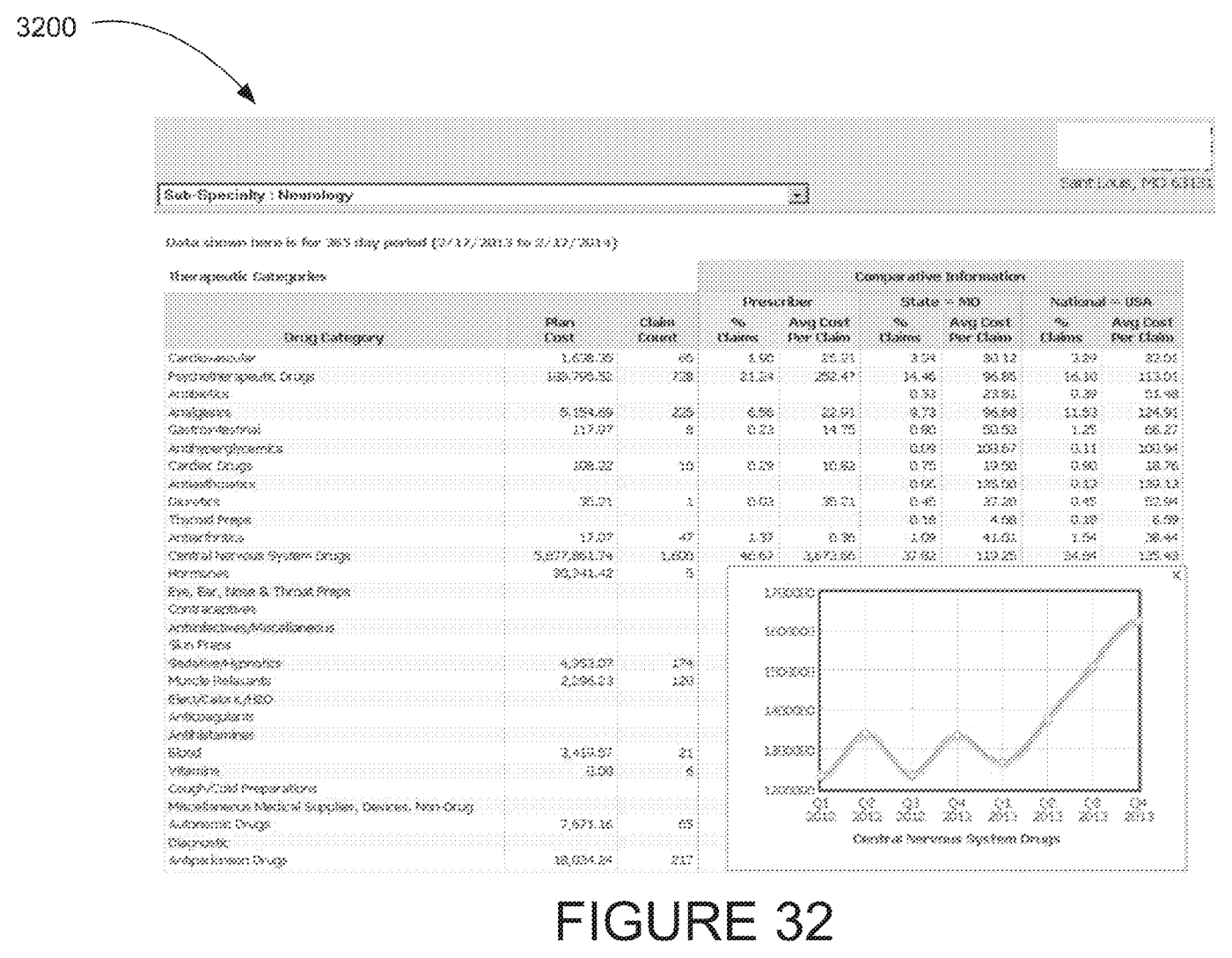

FIG. 32 is an example display 3200 that provides a provider benchmarking by therapeutic categories. The drop down menu list may be used to compare prescribers to peers by category, specialty, or sub-specialty. Prescription claims for selected provider and peer group are also broken down by therapeutic categories. Prescribing trends for a therapeutic category may be presented by selecting a desired therapeutic category. Comparisons may be provided at a state, national, or any other geospatial level such as a metropolitan statistical area, city, county, zip code, or the like, or at a practice level, for a certain time period (e.g., for the past 365 days, quarter, month, or the like).

Figure 33:

FIG. 33 is an example display 3300 that provides a provider benchmarking by DEA classification. The display 3300 shows a prescription drug breakdown by DEAD controlled drug categories. Comparisons may be provided at a state and national level for a certain time period (e.g., for the past 365 days, quarter, month, or the like).

Figure 34:
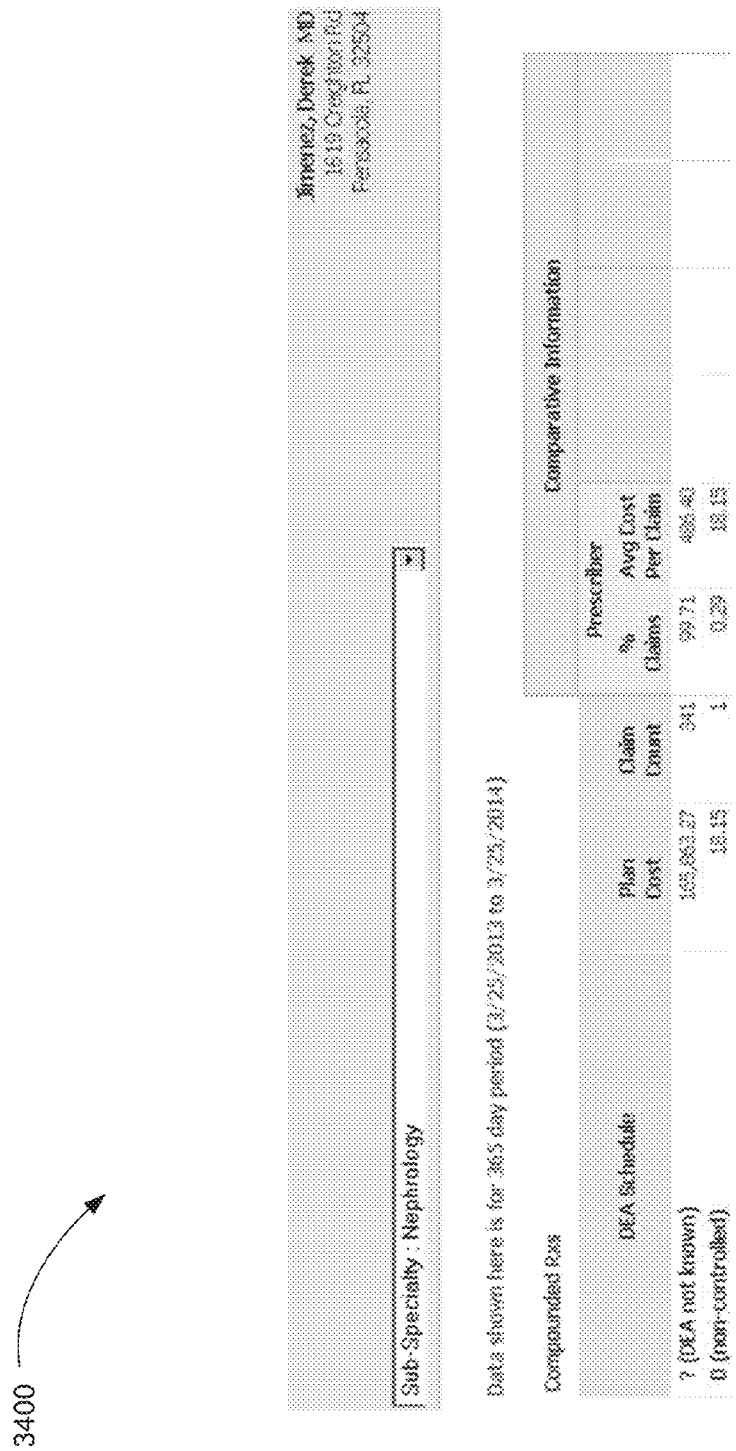

FIG. 34 is an example display 3400 that provides a provider benchmarking by compounded drugs. The display 3400 shows a prescription drug breakdown by DEA controlled drug categories for compounded prescription drug ingredients. Comparisons may be provided at a state, national, or any other geospatial level such as a metropolitan statistical area, city, county, zip code, or the like, or at a practice level, for a certain time period (e.g., for the past 365 days, quarter, month, or the like).

Figure 35:
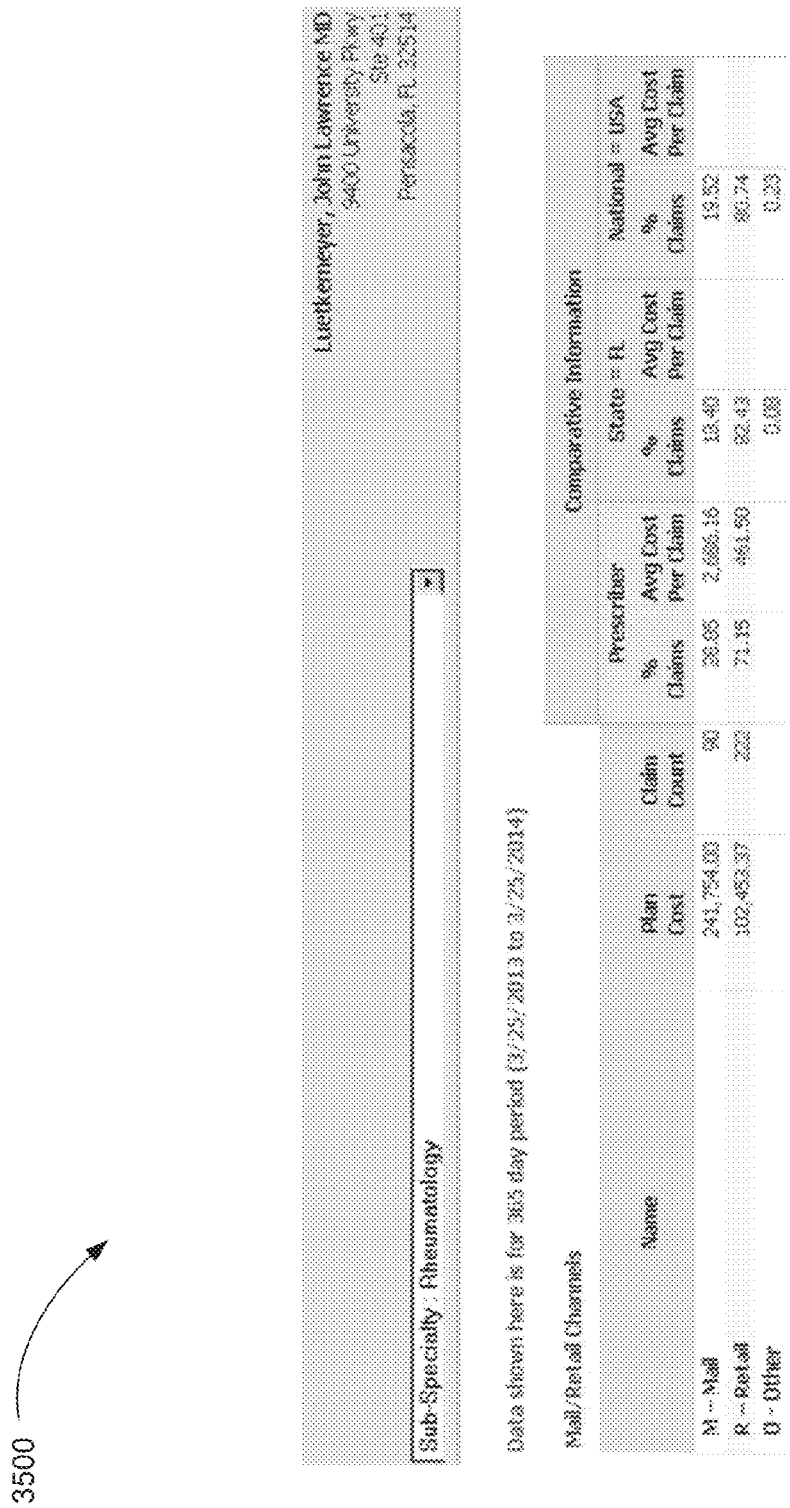

FIG. 35 is an example display 3500 that provides a provider benchmarking by mail/retail channel. The display 3500 shows a prescription claims breakdown by mail, retail, or other channels. Comparisons may be provided at a state, national, or any other geospatial level such as a metropolitan statistical area, city, county, zip code, or the like, or at a practice level, for a certain time period (e.g., for the past 365 days, quarter, month, or the like).

Figure 36:
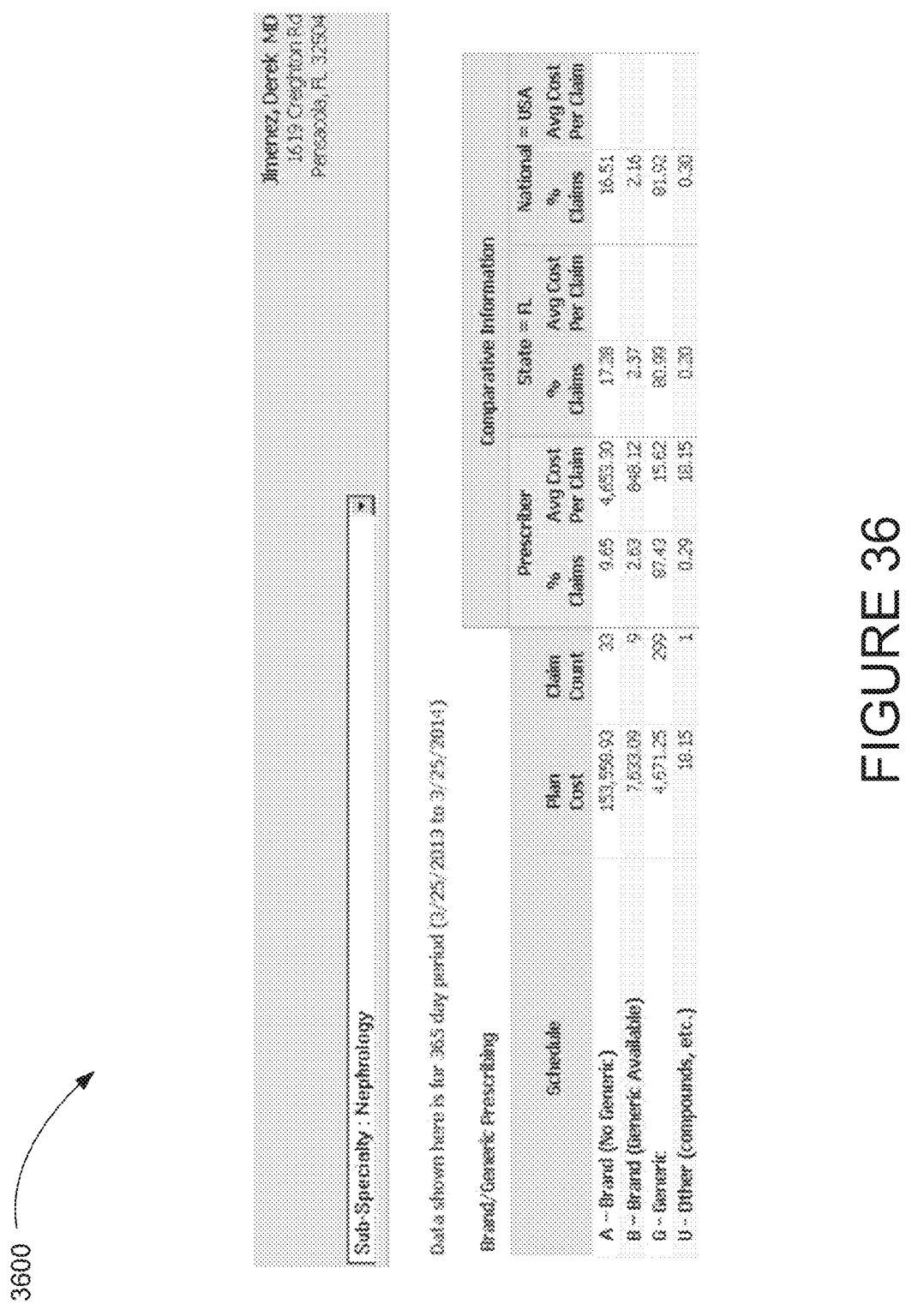

FIG. 36 is an example display 3600 that provides a provider benchmarking by brand/generic prescribing. The display 3600 shows a prescription claims breakdown by brand, multisource, and generic. The other category includes compounded prescription drugs, which may have ingredients with multiple substitution statuses. Comparisons may be provided at a state, national, or any other geospatial level such as a metropolitan statistical area, city, county, zip code, or the like, or at a practice level, for a certain time period (e.g., for the past 365 days, quarter, month, or the like).

Figure 37:

FIG. 37 is an example display 3700 that shows prescription claims breakdown by specialty drugs by plan cost in descending order.

The methods and systems enables analysis and reporting tools/features including prescriber, pharmacy and patient profiles. The profiles may be based on accumulating various data, sums, ratios, or the like by a period of time (e.g., a calendar quarter, a month, a year, or the like) by geographic area (e.g., by state, by county, or the like) and other relevant parameters for prescribers, dispensers and patients. For example, in the case of prescribers, quarterly accumulations may be broken out by provider category, specialty and sub-specialty as relevant parameters for prescriber. Another example of relevant parameters are patient age and/or gender.

Figure 38:
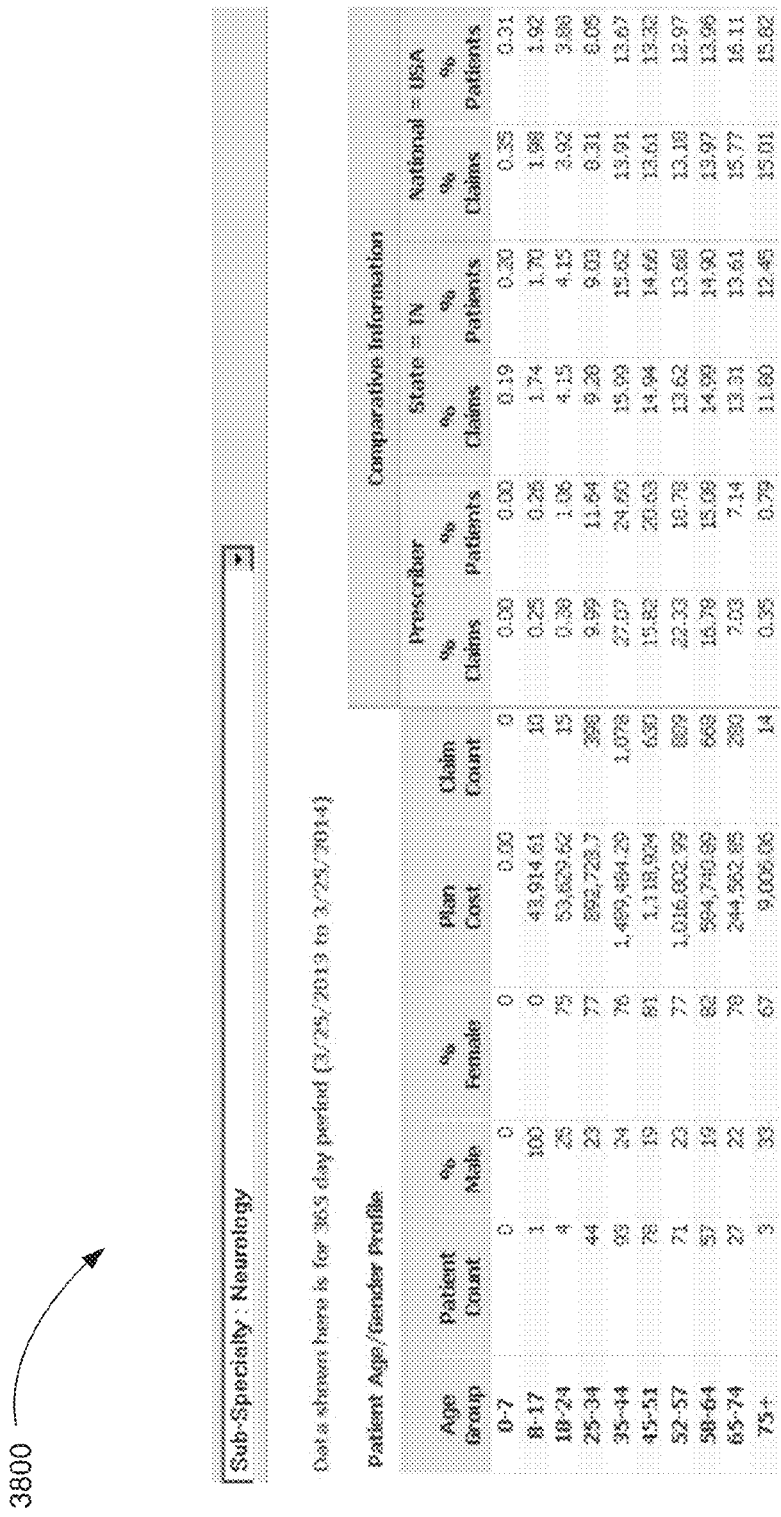

FIG. 38 is an example display 3800 that provides a prescription drug breakdown by age group. Comparisons may be provided at a state, national, or any other geospatial level such as a metropolitan statistical area, city, county, zip code, or the like, or at a practice level, for a certain time period (e.g., for the past 365 days, quarter, month, or the like).

Figure 39:
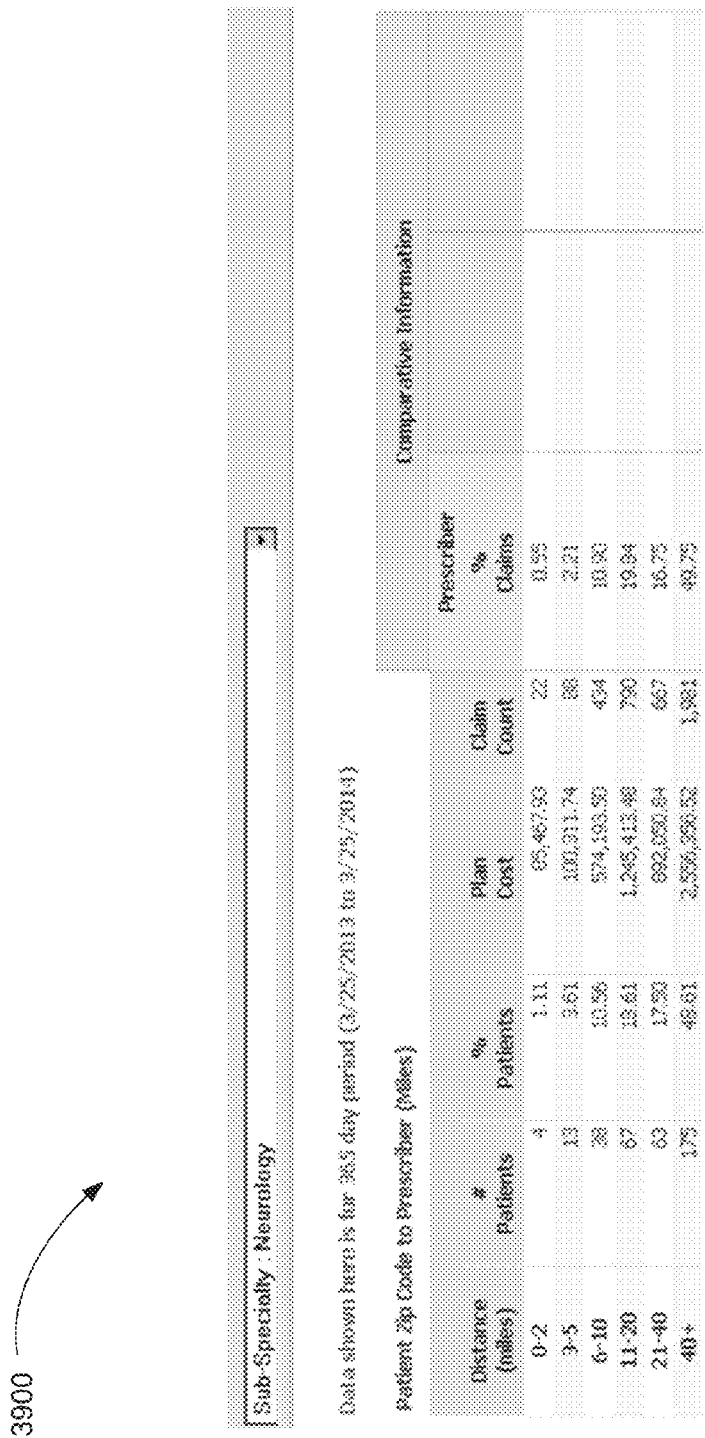

FIG. 39 is an example display 3900 that shows provider benchmarking based on patient driving distance. The display 3900 includes a prescription claim breakdown by patient driving distance to the prescriber in miles. Comparisons may be provided at a state, national, or any other geospatial level such as a metropolitan statistical area, city, county, zip code, or the like, or at a practice level, for a certain time period (e.g., for the past 365 days, quarter, month, or the like).

Figure 40:
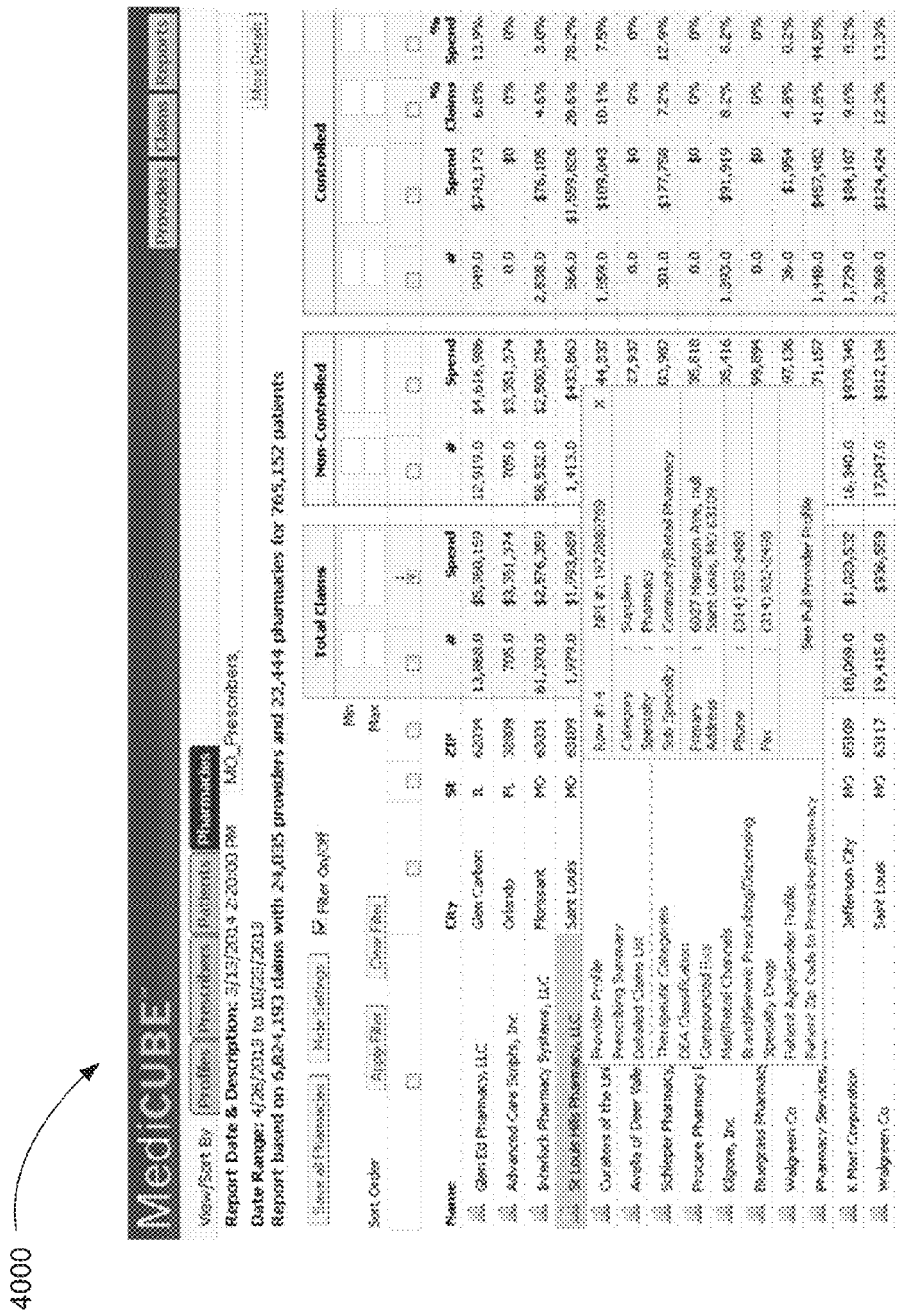

FIG. 40 is an example display 4000 provides a provider/network report from a pharmacy view. A floating context menu is shown as well as filtering and sorting capabilities.

Figure 41:

FIG. 41 is an example display 4100 of detailed claims listing that includes a number of prescription drugs. The sorting may be performed by an operator on any of the data elements such as patient ID, patient age, service date, claim value, drug description, days of supply, or pharmacy identifier in various sorting orders.

Figure 42:
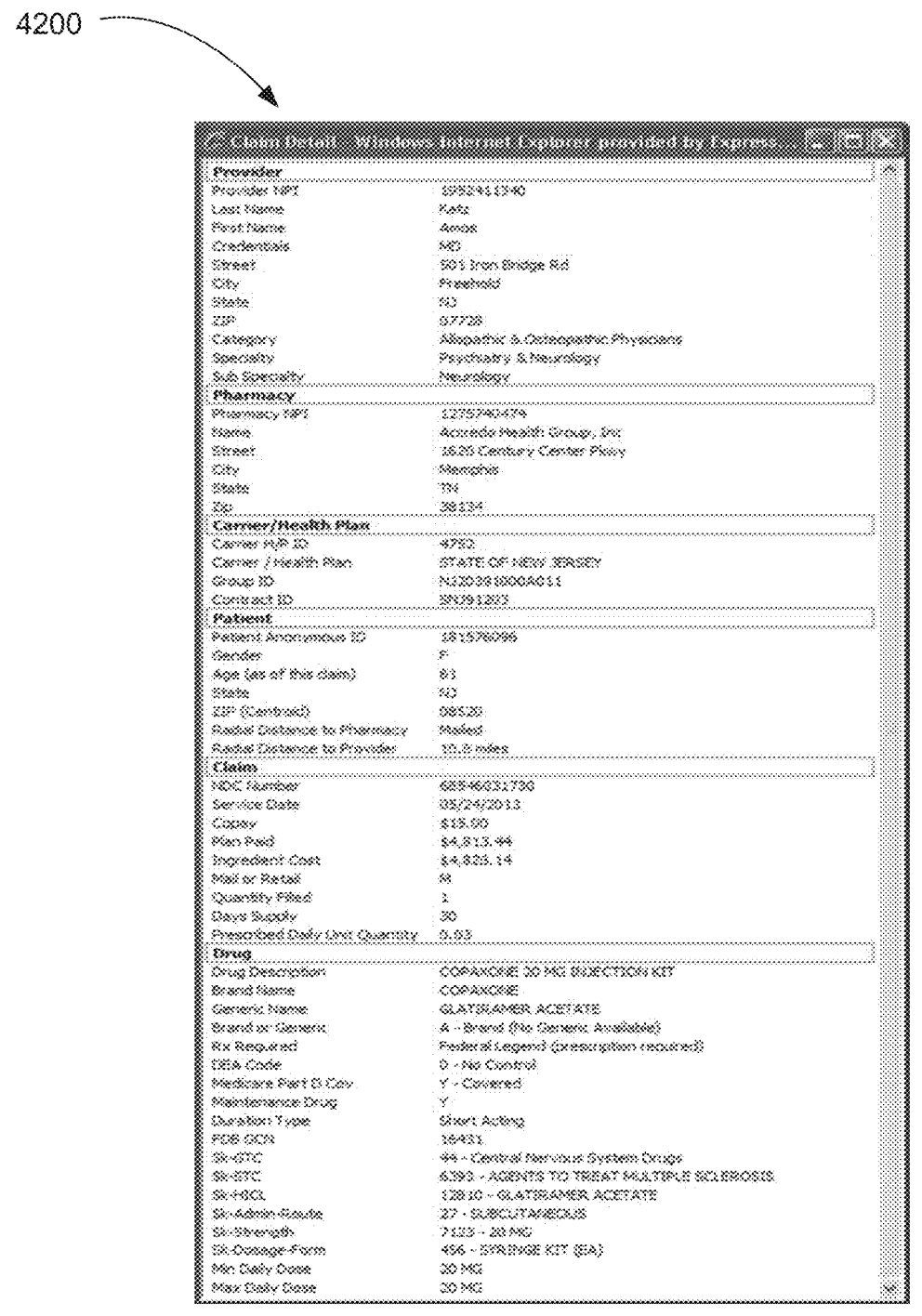

FIG. 42 is an example display 4200 that includes detailed claim information for the claim selected in the display 4100.

Figure 43:

FIG. 43 is an example display 4300 of a detailed claims listing that includes a compound drug.

Figure 44:
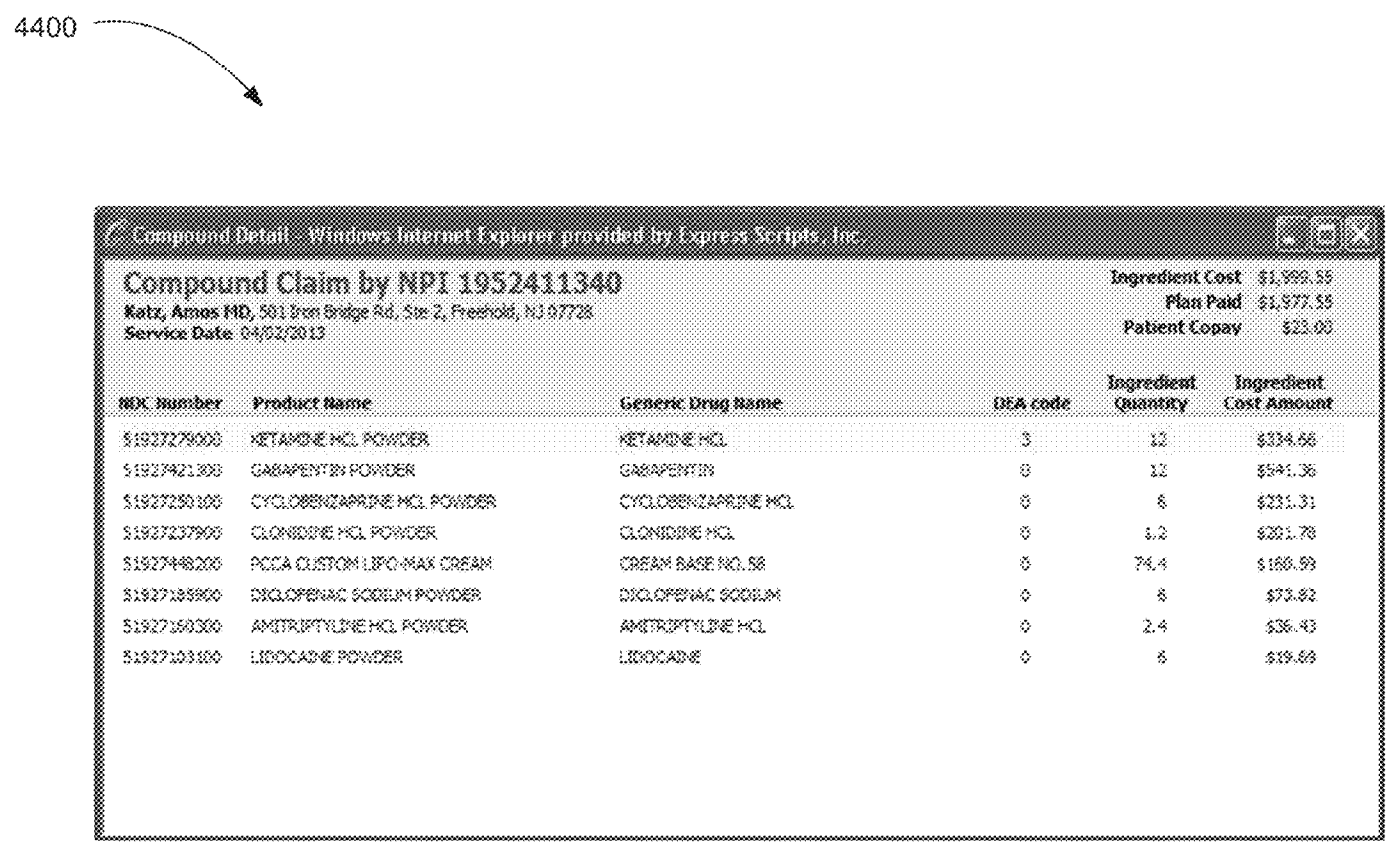

FIG. 44 is an example display 4400 of an ingredient listing for the compound drug row selected in the display 4300.

Figure 45:
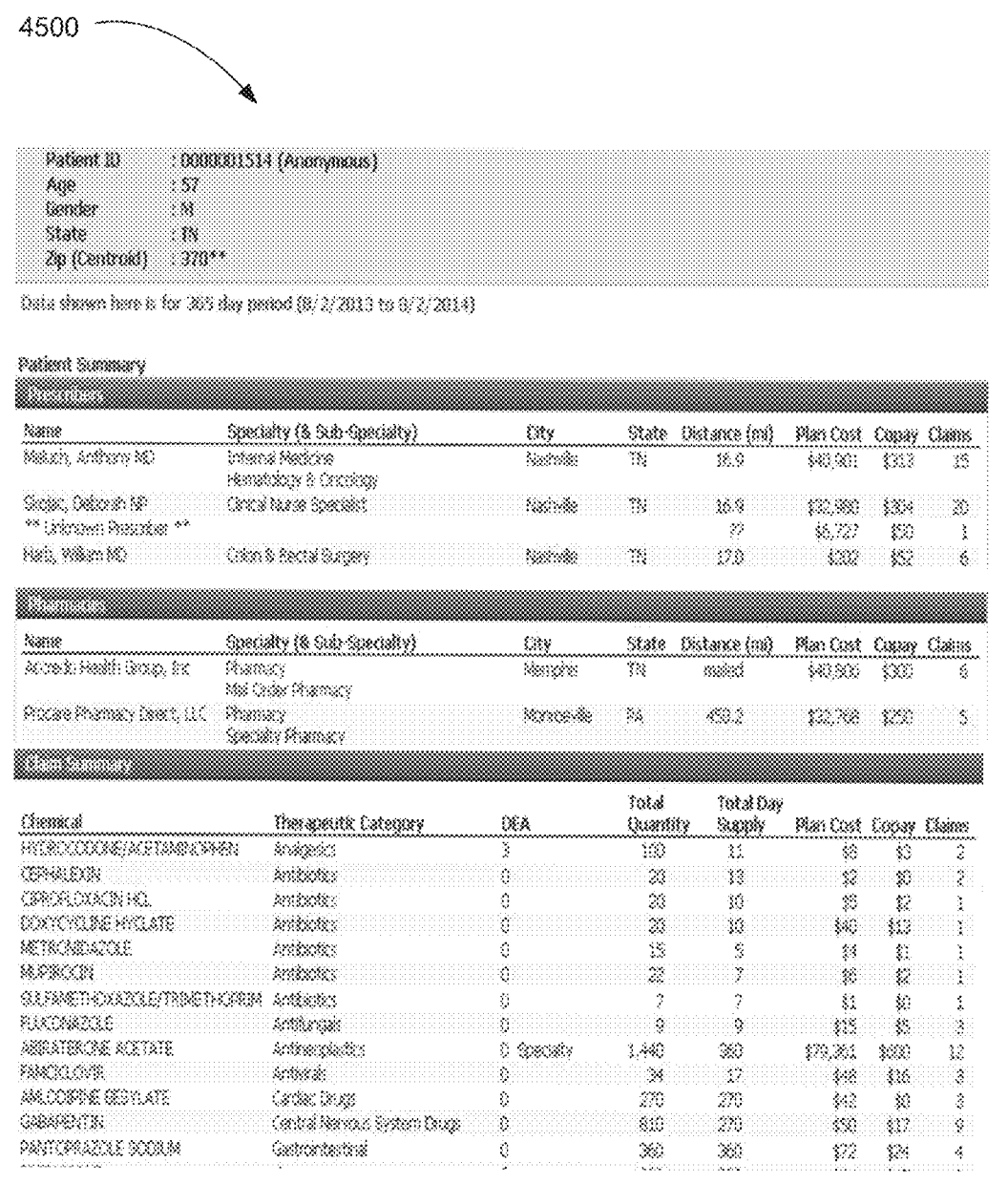
Figure 46:

FIGS. 45 and 46 are example displays 4500, 4600 showing a patient profile that includes a list of prescribers, pharmacies, and/or other dispensing sites, a prescription claims summary, medical diagnosis, and medical procedures. In some embodiments, the displays 4500, 4600 may include other information such as patient demographical information and lab data.

Figure 47:
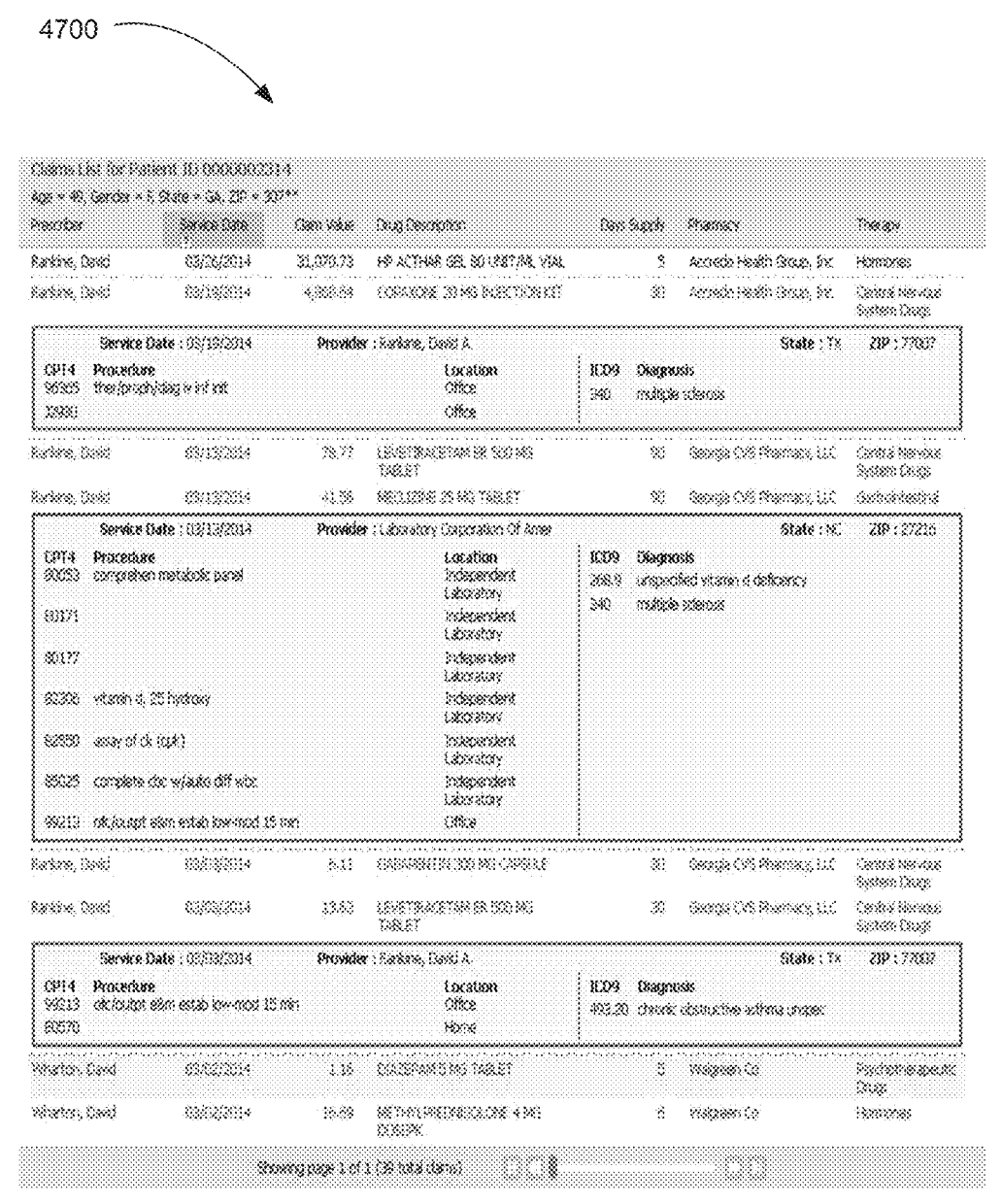

FIG. 47 is an example display 4700 in which patient medical and prescription drug claims are combined together. The matching integration and sorting of prescription drug and medical claims data may be performed based on the service date, provider information (e.g., name, any identifier, affiliations, business relations with other practitioners and practice organizations, or the like), disease state, therapy, comorbidities, and the like. Likewise, such integration may be performed at a pharmacy or a prescriber level.

Figure 48:
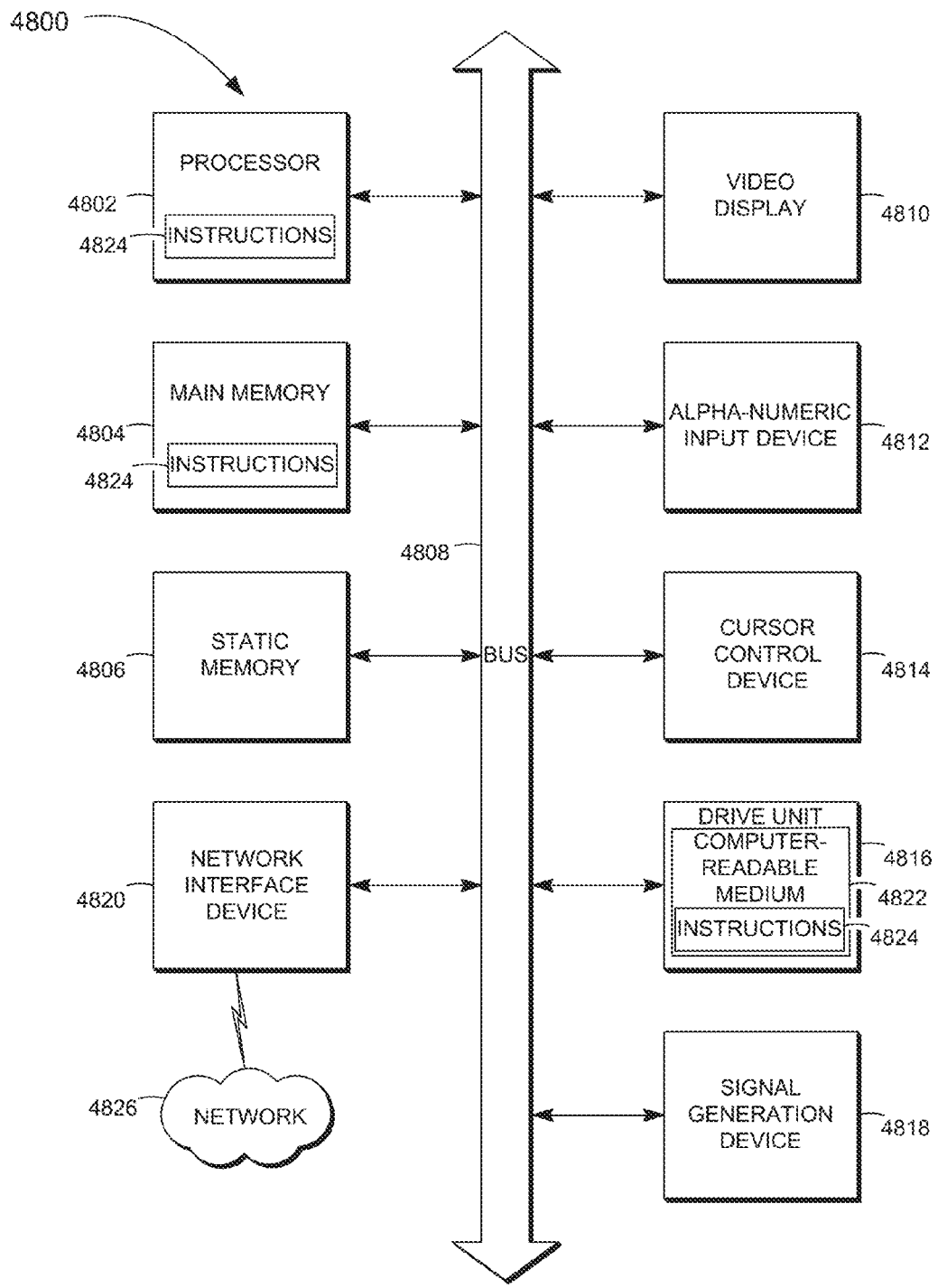
FIG. 48 is a block diagram of a machine in the example form of a computer system within which a set of instructions for causing the machine to perform any one or more of the methodologies discussed herein may be executed or stored.

FIG. 48 shows a block diagram of a machine in the example form of a computer system 4800 within which a set of instructions may be executed causing the machine to perform any one or more than one of the methods, processes, operations, or methodologies discussed herein. The one or more than one of the devices 102, 106, 108, 110, 112 may include the functionality of the one or more than one of the computer systems 4800.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 4800 includes a processor 4802 (e.g., a central processing unit (CPU) a graphics processing unit (GPU) or both), a main memory 4804 and a static memory 4806, which communicate with each other via a bus 4808. The computer system 4800 further includes a video display unit 4810 (e.g., a liquid crystal display (LCD) or a cathode ray tube (CRT)). The computer system 4800 also includes an alphanumeric input device 4812 (e.g., a keyboard), a cursor control device 4814 (e.g., a mouse), a drive unit 4816, a signal generation device 4818 (e.g., a speaker) and a network interface device 4820.

The drive unit 4816 includes a computer-readable medium 4822 on which is stored one or more sets of instructions (e.g., software 4824) embodying any one or more of the methodologies or functions described herein. The software 4824 may also reside, completely or at least partially, within the main memory 4804 and/or within the processor 4812 during execution thereof by the computer system 4800, the main memory 4804 and the processor 4812 also constituting computer-readable media.

The software 4824 may further be transmitted or received over a network 4826 via the network interface device 4820.

While the computer-readable medium 4822 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The device operators or persons and organizations on behalf of whom the device operators may act include patients, healthcare practitioners, pharmacies, health plans, plan members, pharmaceutical manufacturers, insurers, agents, and governmental organizations.

In some embodiments, cleaning source data 120 and/or creating the master data 122 may enable more complete and accurate pulls of claims data 132

Examples of use cases of the foregoing methods and systems includes patient analysis, practitioner analysis, pharmacy analysis, prescription claims analysis, medical claims analysis, health plan analysis, population analysis, health plan member information, and pharmaceutical manufacturer information.

Patient analysis includes analysis of demographics, employer type, practitioners, health, benefits, prescriptions and health claims. Information that can presented to a device operator includes (1) age, gender, family, (2) practitioners utilized, (3) employer, SIC, and health plan, (4) diagnoses history, (5) prescriptions, drugs, prescribers, count, and amount history, (6) medical claims history, and (7) controlled substance prescribing patterns.

Practitioner analysis includes analysis of demographics, specialties, business relationships, health plans, prescribing profile patients, patient demographics, diagnoses, and procedures. Information that can presented to a device operator includes (1) prescribing pattern, drugs, type, variation from standards for each practitioner specialty, (2) patient demographics per practitioner, (e.g., % practice load by age groups), (3) % of prescriptions linked to each age group, (4) most common diagnoses and procedures for each practitioner specialty, (5) associations with health plans, practitioners, medical groups, PPOs, hospitals, (6) controlled substance prescriptions compared to specialty type adjusted for patient age and gender, (7) health claims history and analysis, and (8) long-term prescribing patterns related to controlled drugs.

Pharmacy analysis includes analysis of demographics, ownership, locations pharmacists, prescription profile, practitioners, clients, and patients. Information that can presented to a device operator includes (1) ownership, pharmacists, locations, (2) profile of controlled substances dispensed by class codes, (3) profile of high-volume practitioners by type of drug, (4) health plans serviced, (5) PPO network relationships, and (6) patient demographics.

Prescription claims analysis includes analysis of health plan, administrator, prescriber, pharmacy, errors, fraud, waste, abuse, misuse, and utilization. Information that can presented to a device operator includes (1) commercial plans drug spend and count, (2) Medicare plans drug spend and count, (3) Medicaid plans drug spend and count, (4) controlled drugs by category, spend, and quantity, (5) uncontrolled drugs with high value by drug type, spend, and quantity, (6) selected generic drugs by drug type, spend, quantity, (7) selected patent drugs by drug name, spend, and quantity, (8) average cost per prescription for each drug group type, (9) average age per patient for each drug group type, (10) mode for age of prescribing (the age peak), (11) mine each prescription claim for prescriber/billing org/health plan/address relationships, (12) drug over utilization, (13) drug under utilization Medical claims analysis includes analysis health plan, administrator, practitioner, diagnoses, errors, fraud, waste, abuse, misuse, and utilization. Information that can presented to a device operator includes (1) mine each medical claim for diagnoses, procedures and practitioner/billing org/health plan/address relationships and tax ID, NPI, PPO network, and the like, (2) diagnoses profiles by practitioner specialty, and (3) claims demographics; geography, age group, gender.

Health plan analysis includes employer and member demographics, practitioner network, benefit plan, practitioners, prescription profile, medical profile, and loss ratio. Information that can presented to a device operator includes (1) demographics (Raw data pyramid; national ro regional pyramid), (2) diagnoses by age group, gender, geography (by most relevant Psychiatric and Physical Medicine ICDs; build up list with time), (3) expert analysis and year to year comparison, and (4) drug expenses and analysis.

Population analysis includes demographics, geographic, employer types, practitioner practice by specialty, health, benefit plan design, prescribing patterns, health claims, and diagnoses. Information that can presented to a device operator includes (1) demographics that may define numbers and percentages for predefined age-gender groups (e.g., 0-9, 10-17, 18-24, 25-34, 35-44, 45-54, 55-64, 65-74, 75+), (2) diagnoses analysis that enable section of diagnoses metrics in order of relevance to fraud and abuse; utilize ICD-Age-Gender associations, (3) health indicators that includes health scores can be performed based on major indicators of risk, (4) fraud and abuse, (5) waste and over utilization including a number of events identified as waste, over-utilization, frequency for each, (6) restricted drugs analysis, and (7) high-cost drugs analyses.

Health plan member information includes plan benefits, claims history, and provider choices. Information that can presented to a device operator includes (1) access plan benefits and co-pay and out-of pocket expense status, (2) claims history, and (3) provider finder.

Pharmaceutical manufacturer information includes demographics, employer type, practitioners, health, benefits, prescriptions, health claims, and practitioner practice by specialty, health, benefit plan design, prescribing patterns, health claims, and diagnoses. Information that can presented to a device operator includes (1) comparative drug utilization analysis, (2) provider reference and relationship engine, and (3) provider drug prescribing patterns.

In some embodiments, the methods and systems may be used to determine associations between providers including individual physicians, practice groups, and hospitals. The associations may include current and historical information on contractual arrangements and business relationships of a given provider (e.g., an individual or an organization) with other providers. For example, one features may determinate an association between individual practitioners related to practice groups. In some embodiments, matching may be performed on an address and phone number to among the master data to identify different prescribers at the same physical address and thereby having an association. Such associations may be saved in the master data 112 and, in some embodiments, be referenced as related records.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

In an example embodiment, a plurality of data attributes of comparison data and the plurality of data attributes of a master record are respectively compared to determine that there is a difference, the comparison data originating from a data source. A relative level of source priority of the data source of the comparison data is determined relative to the data source of a current state version of the master record in accordance with source evaluation criteria. The current state version of the master record is stored in reference data based on a determination that there is a difference and that the source priority of the data source of the comparison data is equal to or greater than the data source of the current state version of the master record. Mapped comparison data is used to update the current state version of the master record based on the determination that there is a difference and that the source significance of the data source of the comparison data is equal to or greater than the data source of the current state version of the master record to create an updated state version of the master record, the mapped comparison data being based on the comparison data.

In an example embodiment, systems and methods for cleaning and processing claims data are described. A method includes accessing a first source of claims data. The method also includes accessing a second source of claims data. The second source of claims data may be a cleaned version of the first source of claims data. The method may also include receiving additional data. The method may also include accessing transformations information that reflects a plurality of data transformations in the first source of data to the second source of data. The method may further include identifying transformations relevant to the additional data.

In another example embodiment, systems and method for cleaning claims data may include receiving claims data, and comparing one or more attributes of the claims data to data attributes included within a master data set. The method may also include identifying a difference between the one or more attributes of the claims data and the data attributes included within the master data set. The method may also include identifying a transformation to correct the difference between the one or more attributes of the claims data and the data attributes included within the master data set. The method may further include applying the transformation to the one or more attributes of the data to generate corrected data, and storing the corrected data in the master data set and storing the original/as-is data, corrected data and transformation data in a source data set.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein, "a" or "an" may reflect a single part or multiple parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies. Thus, systems and methods for pharmacy messaging have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:
1. A method comprising:
   developing a master record including a plurality of verified data attributes, at least one of the plurality of verified data attributes being cross-checked among a plurality of various data sources to be deemed correct and current;

obtaining comparison data relevant to prescription drug claims, medical claims, or both the prescription drug claims and the medical claims provided by the plurality of various data sources, the plurality of various data sources including at least one of a benefit manager database, a data supplier database, a data manager database, and a pharmacy database, and the plurality of various data sources being deployed on respective devices, the data manager database configured for storing source data received from at least one of a plurality of various data sources, the master record, and reference data record, the reference data record including a plurality of data attributes that are associated with the plurality of verified data attributes of the master record, wherein the plurality of data attributes of the reference data record are not deemed most significant or valuable;

respectively comparing a plurality of data attributes of the comparison data and the plurality of verified data attributes of the master record to determine that there is a difference;

determining a relative level of source priority of a data source of the plurality of various data sources from which the comparison data is originated from relative to a data source of the plurality of various data sources of a current state version of the master record in accordance with source evaluation criteria;

in response to a determination that there is a difference and that the relative level of source priority of the data source of the comparison data is equal to or greater than the data source of the current state version of the master record, storing the current state version of the master record in the reference data record;

using mapped comparison data to update the current state version of the master record based on the determination that there is a difference and that a source significance of the data source of the comparison data is equal to or greater than the data source of the current state version of the master record to create an updated state version of the master record, the mapped comparison data being based on the comparison data; and in response to a determination that there is a difference and that the source significance of the data source of the comparison data is less than the data source of the current state version of the master record, storing the comparison data in the reference data record.

2. The method of claim 1, further comprising:
identifying a date associated with the comparison data; and
determining whether the date associated with the comparison data is more current than the date associated with the current state version of the master record,
wherein storing the current state version of the master record in the reference data record and using the mapped comparison data to update the current state version of the master record are further based on the date associated with the comparison data is more current than the date associated with the current state version of the master record.

3. The method of claim 1, further comprising:
determining that that comparison data is previously stored in the reference data record as mapped comparison data,
wherein the using the mapped comparison data to update the current state version of the master record is further based on a determination that the comparison data is already stored in the reference data record.

4. The method of claim 1, further comprising:
formatting the comparison data in accordance with a standardized format to create formatted comparison data;
splitting the comparison data in accordance with a standardized field splits format; and
mapping the formatted comparison data into a plurality of data fields based on the standardized field splits format to create the mapped comparison data.

5. The method of claim 1, further comprising:
comparing the source data against a plurality of available master records to identify matching source data and nonmatching source data among the source data, the plurality of available master records including the master record;
formatting the nonmatching source data in accordance with a standardized format to create formatted source data;
splitting the nonmatching source data in accordance with a standardized field splits format; and
mapping the formatted source data into a plurality of data fields based on the standardized field splits format to create the mapped source data,
wherein the mapped source data includes the comparison data.

6. The method of claim 5, further comprising:
determining that there is no standardized format for the at least one of the plurality of various data sources;
transmitting the nonmatching source data to a manual processing device; and
receiving a transmission including the standardized format from the manual processing device,
wherein formatting the nonmatching source data in accordance with the standardized format is based on receipt of the transmission.

7. The method of claim 5, wherein the standardized format includes a standardized spelling format, a standardized capitalization format, a wording appearance format, and a numbering appearance format.

8. The method of claim 5, wherein comparing the source data against the plurality of available master records comprises:
respectively comparing a plurality of source data identifiers with a plurality of master record identifiers of master record data, the master record data including the plurality of available master records;
when a source data identifier of the plurality of source data identifiers matches a master record identifier of the plurality of master record identifiers, identifying a source data portion associated with the source data identifier as being matching source data;
when a source data identifier is missing, blank, or similar but matching at least a portion of a plurality of remaining data attributes of the source data portion matches a corresponding portion of the plurality of available master records, identifying the source data portion as being matching source data; and
when the source data portion of the source data has not otherwise been identified as being matching source data, identifying the source data portion as being nonmatching source data.

9. The method of claim 8, wherein the source data portion is a portion of the source data.

10. The method of claim 8, further comprising:
receiving a source data transformation to correct a portion of the source data
correcting a portion of the source data with the source data transformation to create the source data portion.

11. The method of claim 8, wherein the source data identifier and the master record identifier includes NPI.

12. The method of claim 8, wherein the source data identifier and the master record identifier includes a telephone number, an address, or a telephone number and an address.

13. The method of claim 1, further comprising:
identifying a source data provider associated with the comparison data;
determining whether a source data import from the source data provider has previously been performed; and
when a determination is made that the source data import has previously been performed, selecting a standardized format and a standardized field splits format associated with the source data provider.

14. The method of claim 1, further comprising:
receiving a profile request for a prescriber, a pharmacy, or a patient;
selecting the updated state version of the master record based on receipt of the profile request; and
generating a user interface including at least a portion of the updated state version of the master record.

15. The method of claim 1, wherein the mapped comparison data includes a name, an address, and a taxonomy code.

16. The method of claim 1, wherein the source data includes prescription claims data, medical claims data, and governmental data.

17. The method of claim 1, wherein the source data is received from a client.

18. The method of claim 1, wherein the master record is a prescriber record of a specific prescriber and the comparison data is associated with the specific prescriber, the master record is a patient record of a specific patient and the comparison data is associated with the specific patient, or a specific pharmacy and the comparison data is associated with the specific pharmacy.

19. A non-transitory machine-readable medium comprising instructions, which when executed by one or more processors, cause the one or more processors to perform the following operations:
develop a master record including a plurality of verified data attributes, at least one of the plurality of verified data attributes being cross-checked among a plurality of various data sources to be deemed correct and current;
obtain comparison data relevant to prescription drug claims, medical claims, or both the prescription drug claims and the medical claims provided by the plurality of various data sources, the plurality of various data sources including at least one of a benefit manager database, a data supplier database, a data manager database, and a pharmacy database, and the plurality of various data sources being deployed on respective devices, the data manager database being configured for storing source data received from at least one of the plurality of various data sources, the master record, and reference data record, the reference data record including a plurality of data attributes that are associated with the plurality of verified data attributes of the master record, wherein the plurality of data attributes of the reference data record are not deemed most significant or valuable;
respectively compare a plurality of data attributes of the comparison data and the plurality of verified data attributes of the master record to determine that there is a difference;
determine a relative level of source priority of a data source of the plurality of various data sources from which the comparison data is originated from relative to a data source of the plurality of various data sources of a current state version of the master record in accordance with source evaluation criteria;
store the current state version of the master record in reference data record in response to a determination that there is a difference and that the relative level of source priority of the data source of the comparison data is equal to or greater than the data source of the current state version of the master record;
use mapped comparison data to update the current state version of the master record based on the determination that there is a difference and that a source significance of the data source of the comparison data is equal to or greater than the data source of the current state version of the master record to create an updated state version of the master record, the mapped comparison data being based on the comparison data; and
store the comparison data in the reference data record in response to a determination that there is a difference and that the source significance of the data source of the comparison data is less than the data source of the current state version of the master record.

20. The method of claim 1, further comprising setting the source evaluation criteria according to at least one of the following:
(a) past analysis of correctness of the data source received from the plurality of various data sources; and
(b) resource importance of the data source received from the plurality of various data sources.

* * * * *